(12) United States Patent
Fukumoto

(10) Patent No.: US 12,019,304 B2
(45) Date of Patent: Jun. 25, 2024

(54) OBSERVATION OPTICAL SYSTEM

(71) Applicant: NIKON VISION CO., LTD., Tokyo (JP)

(72) Inventor: Satoshi Fukumoto, Yokohama (JP)

(73) Assignee: NIKON VISION CO., LTD., Tokyo (JP)

( * ) Notice: Subject to any disclaimer, the term of this patent is extended or adjusted under 35 U.S.C. 154(b) by 748 days.

(21) Appl. No.: 17/251,813

(22) PCT Filed: Feb. 27, 2019

(86) PCT No.: PCT/JP2019/007475
§ 371 (c)(1),
(2) Date: Dec. 13, 2020

(87) PCT Pub. No.: WO2019/239645
PCT Pub. Date: Dec. 19, 2019

(65) Prior Publication Data
US 2021/0149153 A1    May 20, 2021

(30) Foreign Application Priority Data
Jun. 14, 2018 (JP) .................. 2018-113760

(51) Int. Cl.
G02B 27/64      (2006.01)
G02B 7/04       (2021.01)
(Continued)

(52) U.S. Cl.
CPC ............... G02B 9/12 (2013.01); G02B 7/04 (2013.01); G02B 13/02 (2013.01); G02B 23/00 (2013.01); G02B 25/001 (2013.01); G02B 27/646 (2013.01)

(58) Field of Classification Search
None
See application file for complete search history.

(56) References Cited

U.S. PATENT DOCUMENTS

2003/0048534 A1    3/2003  Yoneyama
2013/0135514 A1    5/2013  Maetaki
(Continued)

FOREIGN PATENT DOCUMENTS

JP    11-133312 A    5/1999
JP    2001-116989 A  4/2001
(Continued)

OTHER PUBLICATIONS

International Search Report from International Patent Application No. PCT/JP2019/007475, dated Jun. 4, 2019.
(Continued)

*Primary Examiner* — Derek S. Chapel
(74) *Attorney, Agent, or Firm* — Potomac Law Group, PLLC

(57) ABSTRACT

An objective optical system which forms an observation optical system consists of, in order from the object, a first lens group that has positive refractive power, a second lens group that has positive or negative refractive power, and a third lens group that has negative refractive power. Focusing is performed by moving the second lens group along an optical axis, the third lens group is configured to move in a direction that is perpendicular to the optical axis to correct image blur, and the following conditional expression is satisfied: $0.70 \leq f1/f12 \leq 1.50$, where f1 denotes a focal length of the first lens group, and f12 denotes a combined focal length of the first lens group and the second lens group.

20 Claims, 24 Drawing Sheets

(51) Int. Cl.
    *G02B 9/12*     (2006.01)
    *G02B 13/02*     (2006.01)
    *G02B 23/00*     (2006.01)
    *G02B 25/00*     (2006.01)

(56) References Cited

U.S. PATENT DOCUMENTS

| | | | |
|---|---|---|---|
| 2016/0011433 A1 | 1/2016 | Tautz et al. | |
| 2016/0124243 A1* | 5/2016 | Miyazaki | G02B 27/646 |
| | | | 359/557 |

FOREIGN PATENT DOCUMENTS

| | | |
|---|---|---|
| JP | 2003-057537 A | 2/2003 |
| JP | 2008-040065 A | 2/2008 |
| JP | 2008-089659 A | 4/2008 |
| JP | 2008-180964 A | 8/2008 |
| JP | 2013-114133 A | 6/2013 |
| JP | 2013-186458 A | 9/2013 |
| JP | 2017-215491 A | 12/2017 |

OTHER PUBLICATIONS

Office Action dated Sep. 26, 2022, in Chinese Patent Application No. 201980038299.0.
International Preliminary Report on Patentability from International Patent Application No. PCT/JP2019/007475, dated Dec. 24, 2020.
Extended European search report dated Feb. 2, 2022, in European Patent Application No. 19820171.7.
Office Action dated Jun. 29, 2022, in Chinese Patent Application No. 201980038299.0.
Office Action dated Nov. 17, 2021, in Chinese Patent Application No. 201980038299.0.
Office Action dated Aug. 17, 2021, in Japanese Patent Application No. 2020-525251.

\* cited by examiner

Spherical Aberration

Astigmatism    Lateral aberration

Astigmatism    Lateral aberration

Astigmatism | Lateral aberration

Astigmatism | Lateral aberration

OBSERVATION OPTICAL SYSTEM

TECHNICAL FIELD

The present invention relates to an observation optical system used in a telescope, binoculars or the like.

TECHNICAL BACKGROUND

Various optical systems capable of decentering predetermined lenses with respect to optical axes in order to correct image blur caused by vibration, such as hand shaking, have been proposed. As observation optical systems used in telescopes, binoculars, laser range finders, or the like, observation optical systems with mechanisms for correcting image blur provided in objective optical systems have been proposed (see Patent literature 1, for example). However, there have been no observation optical systems in the related art that have sufficient performance in terms of both a vibration proof function and a focusing function.

PRIOR ARTS LIST

Patent Document

Patent literature 1: Japanese Laid-Open Patent Publication No. 2003-057537(A)

SUMMARY OF THE INVENTION

An observation optical system according to an aspect of the present application comprises: an objective optical system; and an eyepiece optical system for observing an image formed by the objective optical system, the objective optical system and the eyepiece optical system being aligned in order from an object, wherein the objective optical system consists of, in order from the object, a first lens group that has positive refractive power, a second lens group that has positive or negative refractive power, and a third lens group that has negative refractive power, focusing is performed by moving the second lens group along an optical axis, the third lens group is configured to move in a direction that is perpendicular to the optical axis to correct image blur, and the following condition expression is satisfied:

$$0:70 f1/f12 \leq 1.50$$

Where f1 denotes a focal length of the first lens group, and f12 denotes a combined focal length of the first lens group and the second lens group.

BRIEF DESCRIPTION OF THE DRAWINGS

FIG. 4A shows various aberrations corresponding to positive angles of view, and FIG. 4B shows various aberrations corresponding to negative angles of view;

FIG. 8A shows various aberrations corresponding to positive angles of view, and FIG. 8B shows various aberrations corresponding to negative angles of view;

FIG. 12A shows various aberrations corresponding to positive angles of view, and FIG. 12B shows various aberrations corresponding to negative angles of view;

FIG. 16A shows various aberrations corresponding to positive angles of view, and FIG. 16B shows various aberrations corresponding to negative angles of view;

FIGS. 20A and 20B are graphs showing various aberrations of the observation optical system in a state in which image blur corrected, according to the fifth example, in which FIG. 20A shows various aberrations corresponding to positive angles of view, and FIG. 20B shows various aberrations corresponding to negative angles of view;

FIG. 24A shows various aberrations corresponding to positive angles of view, and FIG. 24B shows various aberrations corresponding to negative angles of view.

DESCRIPTION OF THE EMBODIMENTS

Hereinafter, an observation optical system according to the present embodiment will be described with reference to drawings. In the present embodiment, an observation optical system that has a small configuration, is still capable of obtaining both a sufficient amount of correction of image blur for image shake or the like and an appropriate amount of movement of a focusing lens group, and is also capable of reducing eccentric aberrations generated in the correction of mage blur will be described. The observation optical system according to the present embodiment is a vibration proof optical system that has a vibration proof function and is used in an optical apparatus such as a telescope, binoculars, or a laser range finder for example. Note that in a case of utilization in binoculars, a pair of left and right observation optical systems are provided to configure a binoculars optical system.

Figure 1:
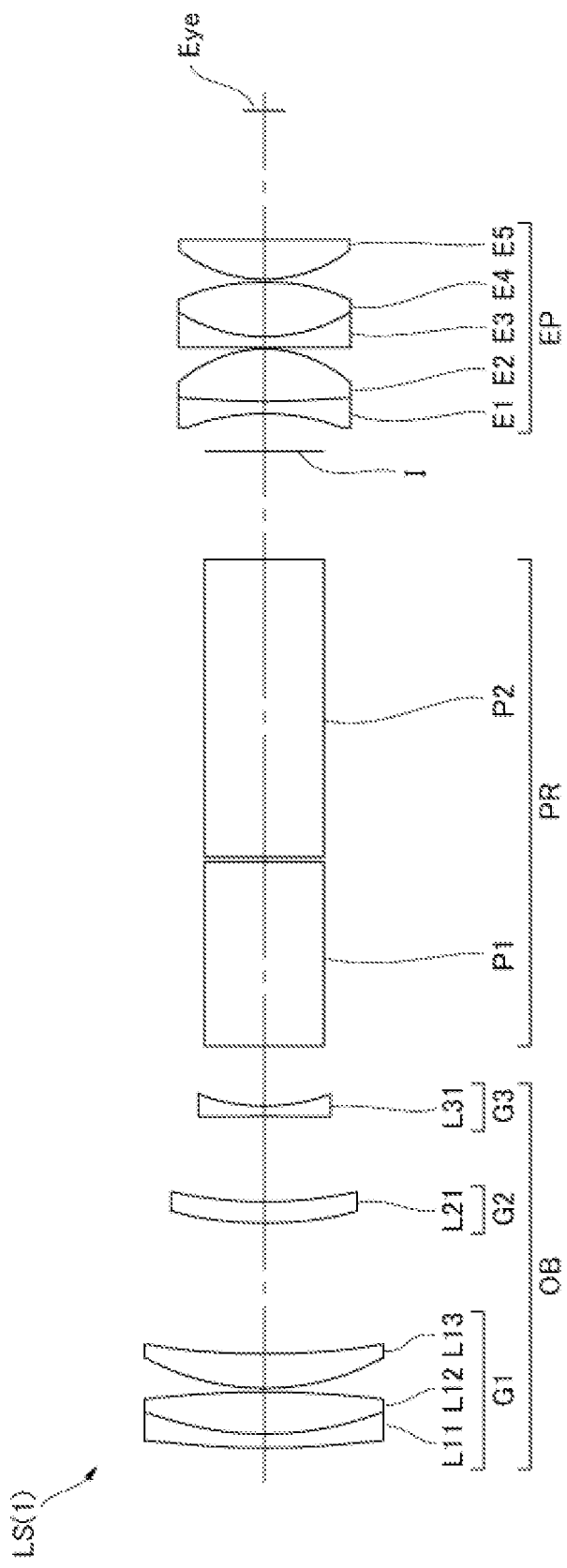
FIG. 1 is a lens configuration diagram of an observation optical system according to a first example.

An observation optical system LS(1) that is an example of a observation optical system LS according to the present embodiment comprises an objective optical system OB through which light from an object (not illustrated) is transmitted, an erecting optical system PR that erects an Image formed by the objective optical system OB, and an eyepiece optical system EP for observing the image erected by the erecting optical system PR, the objective optical system OB, the erecting optical system PR, and the eyepiece optical system EP being aligned in order from the object, as illustrated in FIG. 1. In such an observation optical system LS, light from the object is transmitted through the objective optical system OB and the erecting optical system PR and forms an image (an erected image) of the object in an image forming surface I. The image of the object formed in the image forming surface I is enlarged by the eyepiece optical system EP. In this manner, an observer can observe the image of the object as an erected image via a eyepieces lens EP.

Figure 5:
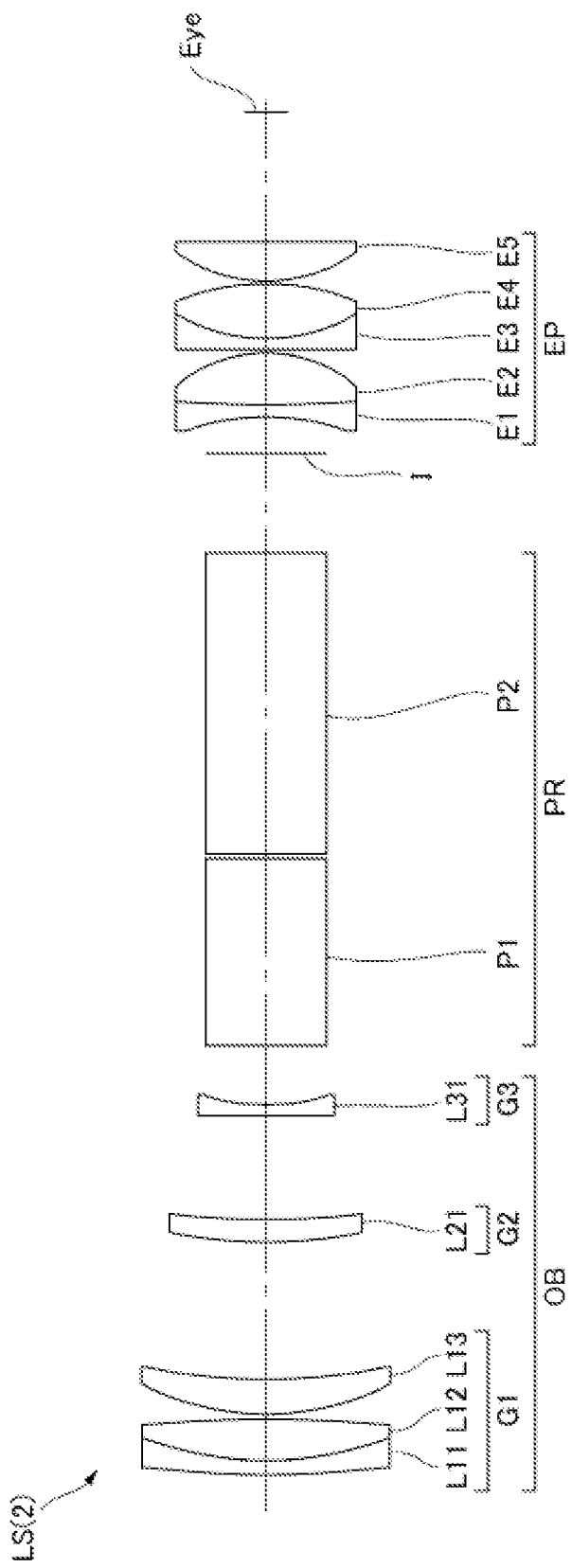
FIG. 5 is a lens configuration diagram of an observation optical system according to a second example.
Figure 9:
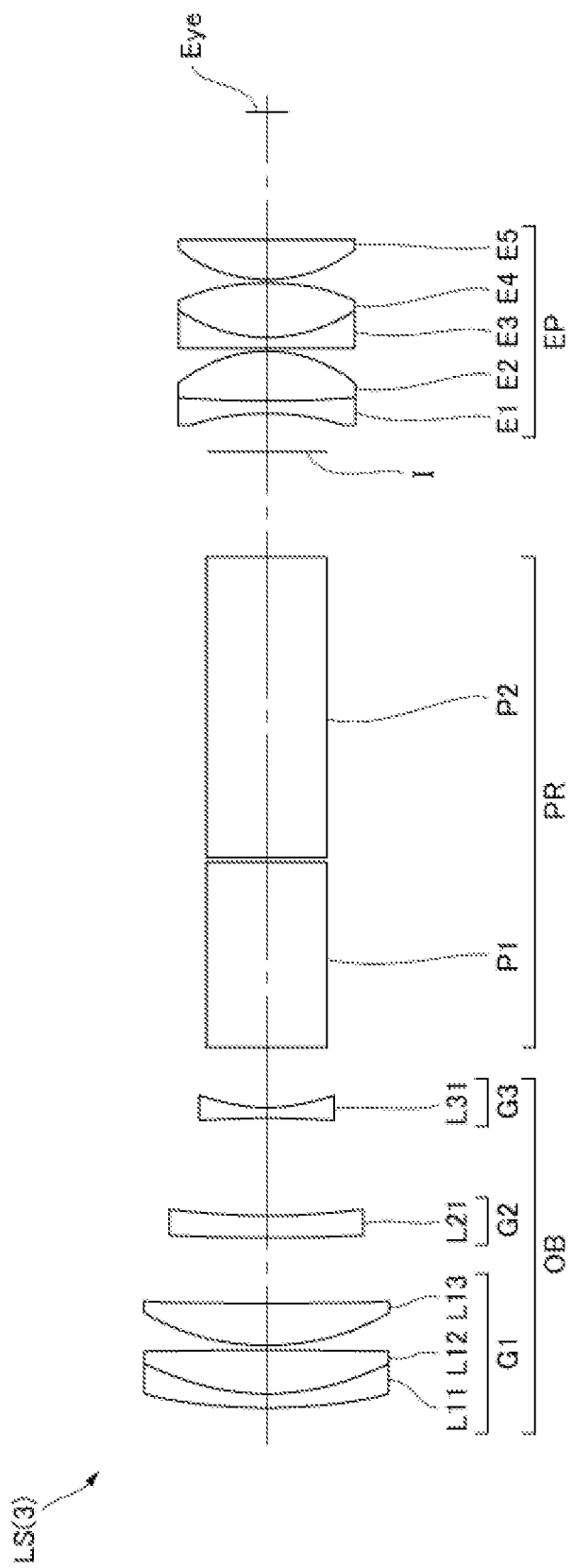
FIG. 9 is a lens configuration diagram of an observation optical system according to a third example.
Figure 13:
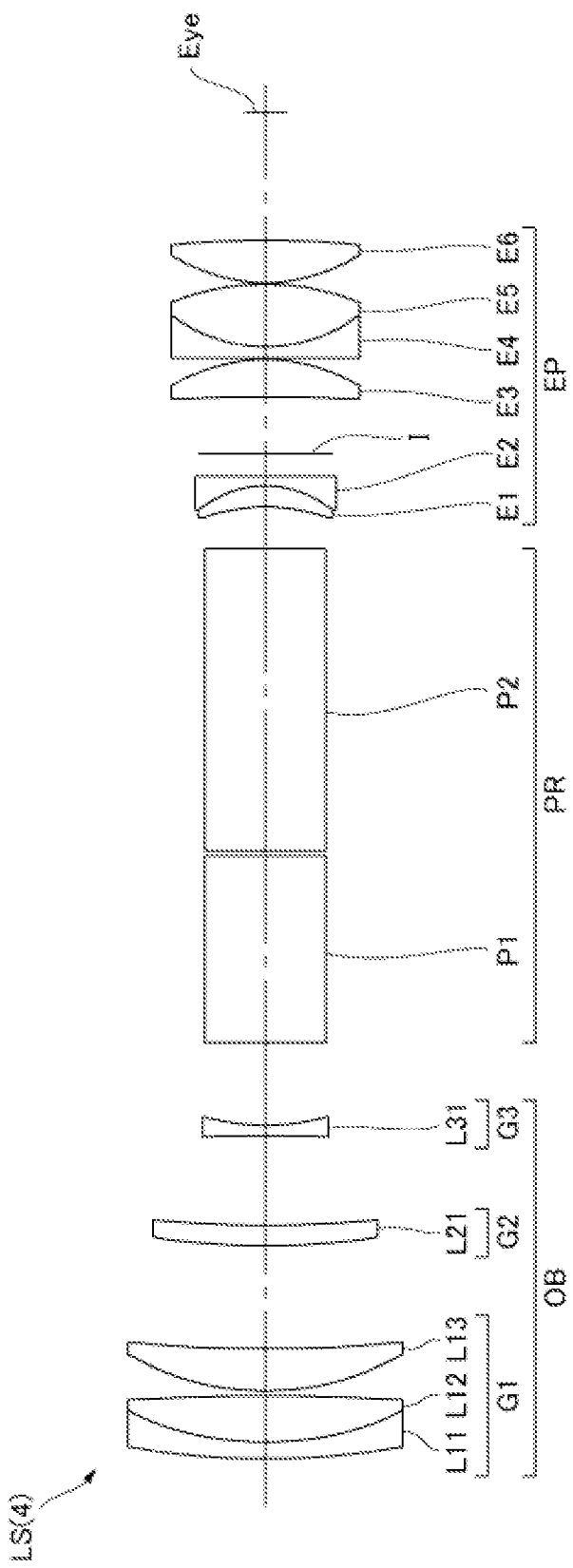
FIG. 13 is a lens configuration diagram of an observation optical system according to a fourth example.
Figure 17:
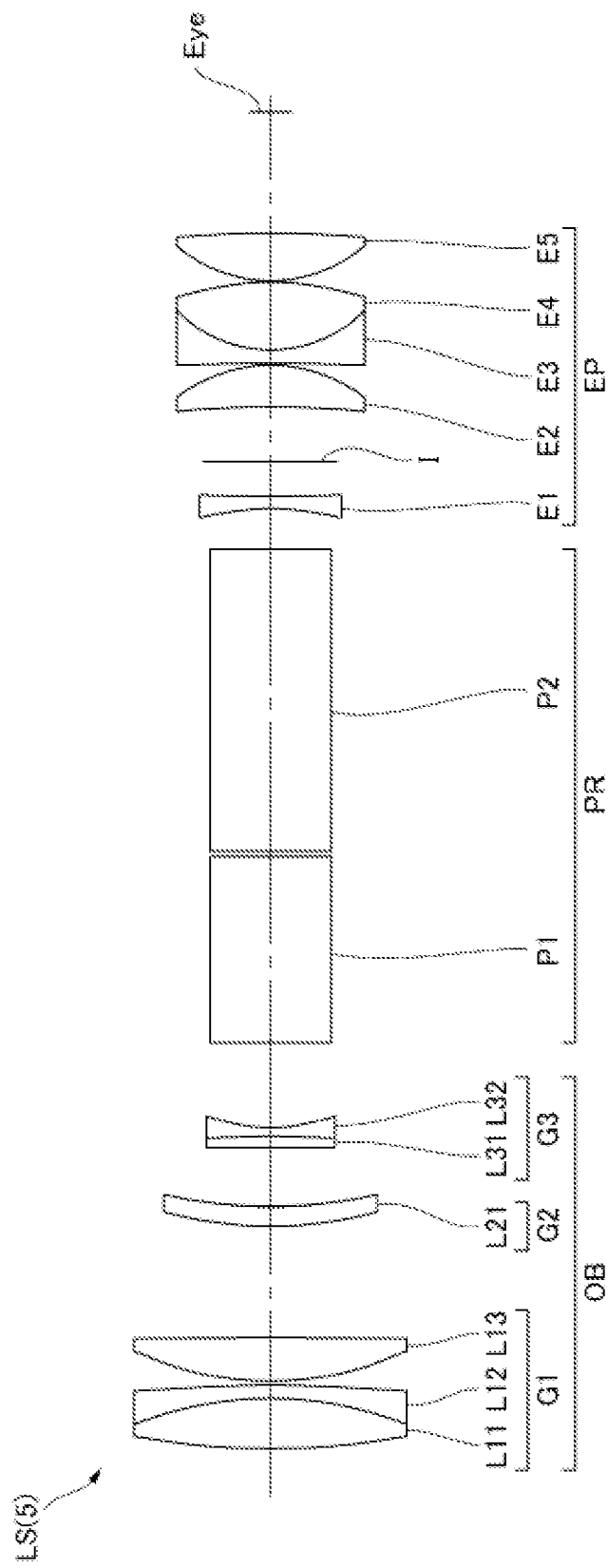
FIG. 17 is a lens configuration diagram of an observation optical system according to a fifth example.
Figure 21:
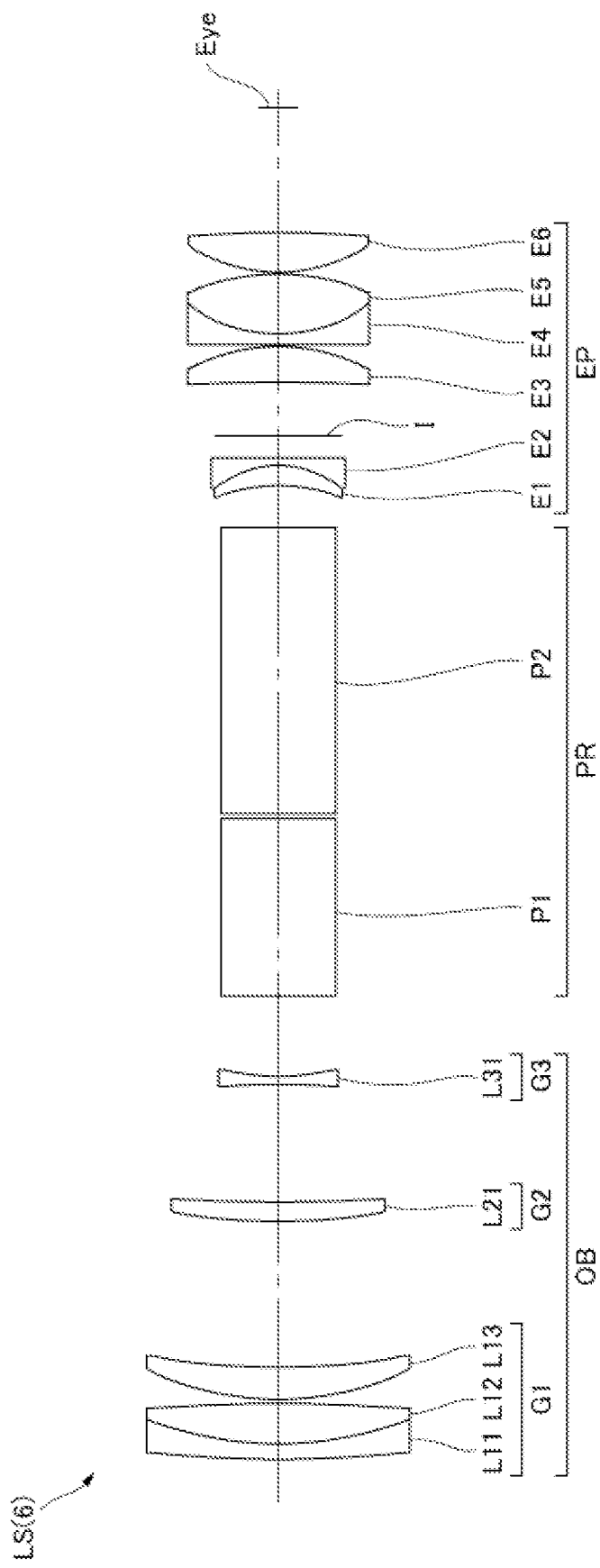
FIG. 21 is a lens configuration diagram of an observation optical system according to a sixth example.

The observation optical system LS according to the present embodiment may be an observation optical system LS(2) illustrated in FIG. 5, may be an observation optical system LS(3) illustrated in FIG. 9, may be an observation optical system LS(4) illustrated in FIG. 13, may be an observation optical system LS(5) illustrated in FIG. 17, or may be an observation optical system LS(6) illustrated in FIG. 21. Note that each of the lenses in the observation optical systems LS(2) to LS(6) illustrated in FIGS. 5, 9, 13, 17, and 21 is configured similarly to that in the observation optical system LS(1) illustrated in FIG. 1.

The objective optical system OB is configured of a first lens group G1 that has positive refractive power, a second lens group G2 that has positive or negative refractive power, and a third lens group G3 that has negative refractive power, the first lens group G1, the second lens group G2, and the third lens group G3 being aligned in order from the object. Focusing is performed by moving the second lens group G2 as a focusing lens group along an optical axis. In a case in which the second lens group G2 has positive refractive power, and in focusing from a state of focusing on infinity to a state of focusing on a short-distance (finite) object, the second lens group G2 moves to the side of the object along the optical axis. In a case in which the second lens group G2 has negative refractive power, and in focusing from a state of focusing on infinity to a state of focusing on a short-distance object, the second lens group G2 moves on the side of the image along the optical axis.

Also, the image position is changed by moving the third lens group G3 as a vibration proof lens group in a direction that is perpendicular to the optical axis (that is, decentering the third lens group G3 with respect to the optical axis) to correct image blur. Intervals between lens groups are set so as to be able to secure an installation space of a vibration proof mechanism for correcting image blur, an installation space of a focusing mechanism for performing focusing, and a movement space for a second lens group G2 at the time of the focusing.

Typically, a ratio of the amount of correction of image blur in an image surface with respect to the amount of shift (the amount of movement in the direction that is perpendicular to the optical axis) of the vibration proof lens group is preferably about 1 to 2. If the ratio low, it is necessary to increase the amount of shift of the vibration proof lens group to sufficiently correct image blur caused by hand shaking or the like, and the vibration proof mechanism increases in size. On the other side, if the ratio is excessively high, vibrations in aberration increase when image blur is corrected, and a degree of decentering sensitivity of the vibration proof lens group (with respect to the optical axis) at the time of assembly becomes high, which is unfavorable.

Also, the observation optical system used in binoculars or the like can perform focusing within a range from infinity to a short distance of about 3 m. If the amount of movement of the focusing lens group within the focusing range is small, the sensitivity with respect to displacement of the focusing lens group becomes high, and even a slight displacement of the focusing lens group thus leads to a change in focusing position. This requires high precision and complexity of the focusing mechanism. In a case of the observation optical systems used in binoculars, a difference my occur between focusing positions of the left and right observation optical systems. Also, if the amount of movement of the focusing lens group within the focusing range is small, a lens barrel supporting the focusing lens becomes short, and the focusing lens group thus becomes unstable and is more likely to be decentered, which leads to degradation of image forming performance. On the other hand, if the amount of movement of the focusing lens group within the focusing range is large, it is difficult to secure the movement space for the focusing lens group in the observation optical systems.

For these reasons, it is important satisfy both a sufficient vibration proof correction angle (the amount of correction of image blur) for image shake or the like and the appropriate amount of movement of the focusing lens group. Thus, the observation optical system LS according to the present embodiment preferably satisfies following conditional expression (1).

$$0.70 \le f1/f12 \le 1.50 \quad (1)$$

Where f1 denotes a focal length of the first lens group G1, and f12 denotes a combined focal length of the first lens group G1 and the second lens group G2.

The conditional expression (1) is a conditional expression that defines a ratio between the focal length of the first lens group G1 and the combined focal length of the first lens group G1 and the second lens group G2. It is possible to obtain both the sufficient amount of correction of image blur for image shake or the like and the appropriate amount of movement of the focusing lens group (second lens group G2) by satisfying the conditional expression (1).

If the corresponding value of the conditional expression (1) is below the lower limit value, the focal length of the first lens group G1 becomes short, and it is thus particularly difficult to correct spherical aberrations. In order to assure the effects of the present embodiment, the lower limit value of the conditional expression (1) may be preferably 0.80.

If the corresponding value of the conditional expression (1) is above the upper limit value, the degree of decentering sensitivity of the third lens group G3 (vibration proof lens group) becomes high, and the amount of movement of the second lens group G2 (focusing lens group) in the focusing range decreases. Therefore, it is difficult to satisfy both the sufficient amount of correction of image blur for image shake or the like and the appropriate amount of movement of the focusing lens group, which is unfavorable. In order to assure the effects of the present embodiment, the upper limit value of the conditional expression (1) may be preferably 1.40.

The observation optical system LS according to the present embodiment may satisfy the following conditional expressions (2) and (3).

$$0.07 \leq |f1/f2| \leq 0.70 \quad (2)$$

$$-0.50 \leq f3/f \leq -0.15 \quad (3)$$

where f denotes a focal length of the objective optical system OB, f2 denotes a focal length of the second lens group G2, and
f3 denotes a focal length of the third lens group G3.

The conditional expression (2) is a conditional expression that defines a ratio between the focal length of the first lens group G1 and the focal length of the second lens group G2. If the corresponding value of the conditional expression (2) below the lower limit value, the focal length of the second lens group G2 becomes long, the amount of movement of the second lens group G2 (focusing lens group) thus increases, and it is difficult to secure the movement space for the second lens group G2 in the observation optical system LS. In order to ascertain the effects of the present embodiment, the lower limit value of the conditional expression (2) may be preferably 0.10.

If the corresponding value of the conditional expression (2) is above the upper limit value, the amount of movement of the second lens group G2 (focusing lens group) becomes small, and it is thus difficult to stably perform focusing, which is unfavorable. In order to ascertain the affects of the present embodiment, the upper limit value of the conditional expression (2) may be preferably 0.50.

The conditional expression (3) is a conditional expression that defines a ratio between the focal length of the third lens group G3 and the focal length of the entire objective optical system OB. Back focusing is controlled by the conditional expression (3). If the corresponding value of the conditional expression (3) is below the lower limit value, the back focusing becomes short, and it is thus difficult to secure the disposition space for the erecting optical system PR, which is unfavorable. In order to ascertain the effects of the present embodiment, the limit value of the conditional expression (3) may be preferably −0.40.

If the corresponding value of the conditional expression (3) is above the upper limit value, the third lens group G3 is separated from the image forming surface I as the back focusing becomes longer. This leads to an increase in diameter of the third lens group G3 (vibration proof lens group) and thus an increase in size of the vibration proof mechanism, which is disadvantageous for a decrease in size of the observation optical system LS and is thus unfavorable.

In order to ascertain the effects of the present embodiment, the upper limit value of the conditional expression (3) may be preferably −0.19.

The observation optical system LS according to the present embodiment y satisfy the following conditional expression (4).

$$0.22 \leq f12/f \leq 0.62 \quad (4)$$

where f denotes a focal length of the objective optical system OB.

The conditional expression (4) is a conditional expression that defines a ratio between the combined focal length of the first lens group G1 and the second lens group G2 and the focal length of the entire objective optical system OB. If the corresponding value of the conditional expression (4) is below the lower limit value, the degree of decentering sensitivity of the third lens group G3 (vibration proof lens group) becomes high, and it is thus difficult to perform assembly adjustment of the observation optical system LS, lens shift control at the time of correcting image blur, and the like, which is unfavorable. In order to ascertain the effects of the present embodiment, the lower limit value of the conditional expression (4) may be preferably 0.30.

If the corresponding value of the conditional expression (4) is above the upper limit value, the amount of correction of image blur (vibration proof correction angle) becomes small, and it is thus not possible to obtain a sufficient vibration proof function. In order to ascertain the effects of the present embodiment, the upper limit value of the conditional expression (4) may be preferably 0.50.

In the observation optical system LS according to the present embodiment, the third lens group G3 consists of a single lens and may satisfy the following conditional expression (5).

$$vd3 \geq 45 \quad (5)$$

Where vd3 denotes an Abbe number with reference to a d-line of the single lens in the third lens group G3.

The conditional expression (5) is a conditional expression that defines the Abbe number of the single lens that configures the third lens group G3. If the third lens group G3 as the vibration proof lens group moves in the direction that is perpendicular to the optical axis (that is, the third lens group G3 is decentered with respect to the optical axis), then the chromatic aberrations of magnification change. It is possible to minimize the change in chromatic aberrations of magnification due to the decentering of the third lens group G3 by satisfying the conditional expression (5). In order to ascertain the effects of the present embodiment, the lower limit value of the conditional expression (5) may be preferably 50.

In the observation optical system LS according to the present embodiment, the third lens group G3 may configured of one cemented lens. In this manner, it is possible to minimize the change in chromatic aberrations of magnification due to the decentering of the third lens group G3. Note that the third lens group G3 is not limited to the configuration consisting of the one cemented lens or single lens and may be configured of a plurality of lenses.

In the observation optical system LS according to the present embodiment, the second lens group G2 may have positive refractive power. In this case in focusing from the state of focusing on infinity to the state of focusing on a short-distance (finite) object, the second lens group G2 moves to the side of the object, that is, to the side away from the third lens group G3 that is the vibration proof lens group along the optical axis. Therefore, it is possible to relatively easily secure the movement space for the second lens group G2 in the observation optical system LS. Note that the refractive power that the second lens group G2 has is not limited to the positive refractive power and may have negative refractive power.

In the observation optical system LS according to the present embodiment, the second lens group G2 may be configured of a single lens. The second lens group G2 can have a simple configuration consisting of a single lens in terms of a power balance a chromatic aberration balance with the first lens group G1. Note that the second lens group G2 is not limited to the configuration consisting of a single lens and may be configured of a plurality of lenses.

EXAMPLES

Hereinafter, the observation optical system LS according to an example of the present embodiment will be described on the basis of drawings. FIGS. 1, 5, 9, 13, 17, and 21 are sectional views illustrating configurations of observation optical systems LS {LS(1) to LS(6)} according to first to sixth examples. In FIGS. 1, 5, 9, 13, 17, and 21, each lens group is represented by a combination of a sign G and a number, and each lens is represented by a combination of a sign L and a number for the objective optical system OB. For the erecting optical system PR, each prism is represented by a combination of a sign P and a number. For the eyepiece optical system EP, each lens is represented by a combination of the sign E and a number. In this case, the lenses and the like are represented using combinations of signs and numbers independently for each of the examples in order to prevent the types and the numbers of signs and numbers from increasing and to prevent the increase from leading to complication. Therefore, the same combinations of signs and numbers used across examples do not mean the s configurations.

Tables 1 to 6 will be shown below. Among these, Table 1 is a table showing various data in the first example, Table 2 is a table showing various data in the second example, Table 3 is a table showing various data in the third example, Table 4 is a table showing various data in the fourth example, Table 5 is a table showing various data in the fifth example, and Table 6 is a table showing various data in the sixth example. In each of the examples, a C-line (wavelength λ=656.3 nm), a d-line (wavelength λ=587.6 nm), and an F-line (wavelenthλ=486.1 nm) are selected as calculation targets for aberration properties.

In the table of [General data], f denotes the focal length of the entire objective optical system OB, f1 denotes the focal length of the first lens group G1, f2 denotes the focal length of the second lens group G2, f3 denotes the focal length of the third lens group G3, and f12 denotes the combined focal length of the first lens group G1 and the second lens group G2.

In the table of [Lens data], the surface numbers represent orders of lens surfaces from the object, R denotes a radius curvature corresponding to each surface number (a case of a lens surface projecting on the side of the object is represented by a positive value), D denotes a lens thickness or an air distance corresponding to each surface number on the optical axis, nd denotes a refractive index for the d-line (wavelength λ=587.6 nm) of an optical arterial corresponding to each surface number, and vd denotes the Abbe number with reference to the d-line of the optical material corresponding to each surface number. "∞" of the radius of curvature denotes a plane or an aperture. Also, description of the refractive index of air nd=1.00000 is omitted.

In the table of [Conditional expression corresponding value], values corresponding to the aforementioned conditional expressions (1) to (5) are shown.

Hereinafter, although "mm" is typically used for the focal length f, the radius of curvature R, the distance to the next lens surface D, other lengths, and the like listed as all data values unless particularly indicated otherwise, the unit is not limited thereto since the optical system can obtain equivalent optical performance even if proportional expansion or proportional reduction is performed.

The above description of the tables is common to all the examples, and repeated description will be omitted below.

First Example

The first example will be described using FIGS. 1, 2, 3, 4A and 4B and Table 1. FIG. 1 is a sectional view illustrating a configuration of an observation optical system according to the first example of the present embodiment. The observation optical system LS(1) according to the first example is configured of an objective optical system OB through which light from an object (not illustrated) is transmitted, an erecting optical system PR that erects an image formed by the objective optical system OB, and an eyepiece optical system EP for observing the image erected by the erecting optical system PR, the objective optical system OB, the erecting optical system PR, and the eyepiece optical system EP being aligned in order from the object.

The objective optical system OB is configured of a first lens group G1 that has positive refractive power, a second lens group G2 that has positive refractive power, and a third lens group G3 that has negative refractive power, the first lens group G1, the second lens group G2, and the third lens group G3 being aligned in order from the object. The first lens group G1 is configured of a cemented lens consisting a negative meniscus lens L11 having a convex surface facing the object and a biconvex positive lens L12 and a positive meniscus lens L13 having a convex surface facing the object, the negative meniscus lens L11, the positive lens L12, and the positive meniscus L13 being aligned in order from the object. The second lens group G2 is configured of a positive meniscus lens L21 having a convex surface facing the object. In other words, the second lens group G2 is configured of a single lens that has positive refractive power. The third lens group G3 is configured of a biconcave negative lens L31. In other words, the third lens group G3 is configured of a single lens that has negative refractive power.

The erecting optical system PR is configured of an erecting prism using an auxiliary prism P1 and a Dach prism P2. The eyepiece system EP is configured of a cemented lens consisting of a biconcave negative lens E1 and a biconvex positive lens E2, a cemented lens consisting of a flat concave negative lens E3 having a flat surface facing the object and a biconvex positive lens E4, and a flat convex positive lens E5 having a flat surface facing an eye point, the negative lens E1, the positive lens E2, the negative lens E3, the positive lens E4, and the positive lens E5 being aligned in order from the object. An image forming surface I is disposed between the erecting optical system PR and the eyepiece optical system EP. Note that the auxiliary prism P1 and the Dach prism P2 are schematically illustrated in FIG. 1 for easiness of description.

In this example, in focusing from the state of focusing on infinity to the state of focusing on a short-distance (finite) object, the second lens group G2 as the focusing lens group moves to the side of the object along the optical axis. For example, it is possible to perform focusing from the infinity to the short distance of 3 m, and the amount of movement of the second lens group G2 at this time (in a case in which the amount of movement to the side of the object is represented by a negative (−) value) is −2.9 mm. Also, the third lens group G3 as the vibration proof lens group moves in the direction that is perpendicular to the optical axis to correct image blur on the image forming surface I. The amount of movement (the amount of shift) of the third lens group G3 in the direction that is perpendicular to the optical axis is 0.6 mm, and the amount of correction of image blur (vibration proof correction angle) is 0.48°.

In Table 1 below data values of the observation optical system according to the first example are listed. Note that the distance from the twenty-first surface to the next lens surface is a distance (eye relief) from the last lens surface (twenty-first surface) to the eye point Eye.

TABLE 1

[General Data]

f = 130.8
f1 = 53.5
f2 = 265.3
f3 = −29.3
f12 = 46.6

[Lens Data]

| Surface Number | R | D | nd | νd |
|---|---|---|---|---|
| 1 | 105.6 | 1.5 | 1.8061 | 33.3 |
| 2 | 37.9 | 4.5 | 1.5891 | 61.2 |
| 3 | −130.6 | 0.5 | | |
| 4 | 28 | 3.8 | 1.4875 | 70.3 |
| 5 | 93 | 14.1 | | |
| 6 | 39.8 | 2.4 | 1.5174 | 52.2 |
| 7 | 54.9 | 9.3 | | |
| 8 | −200.8 | 1.2 | 1.6968 | 55.5 |
| 9 | 22.8 | 6.4 | | |
| 10 | ∞ | 20.2 | 1.5688 | 56 |
| 11 | ∞ | 0.4 | | |
| 12 | ∞ | 32.5 | 1.5168 | 64.1 |
| 13 | ∞ | 15.8 | | |
| 14 | −25.2 | 1.3 | 1.8052 | 25.4 |
| 15 | 107 | 5.7 | 1.5891 | 61.2 |
| 16 | −14.3 | 0.2 | | |
| 17 | ∞ | 1.2 | 1.8467 | 23.8 |
| 18 | 18.4 | 6 | 1.5891 | 61.2 |
| 19 | −23.5 | 0.2 | | |
| 20 | 15.7 | 4.3 | 1.6968 | 55.5 |
| 21 | ∞ | 14 | | |

[Conditional Expression Corresponding Value]

Conditional Expression (1) f1/f12 = 1.15
Conditional Expression (2) |f1/f2| = 0.20
Conditional Expression (3) f3/f = −0.22
Conditional Expression (4) f12/f = 0.36
Conditional Expression (5) νd3 = 55.5

Figure 2:
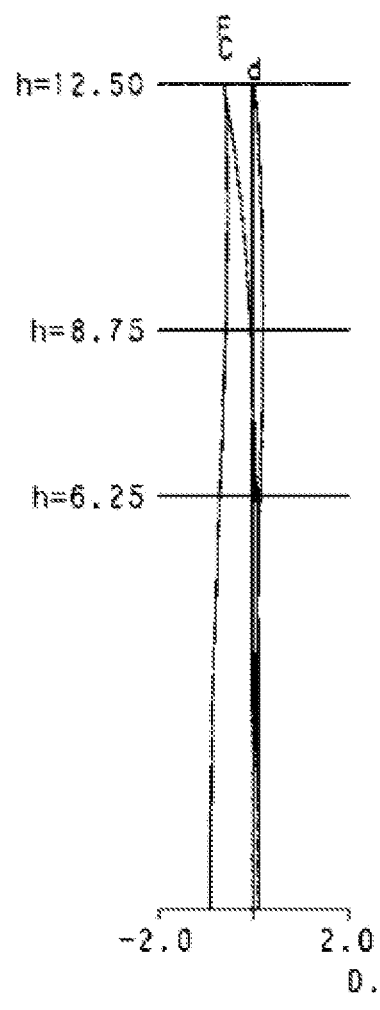
FIG. 2 shows graphs of spherical aberrations of the observation optical system (afocal system) according to the first example.
Figure 3:
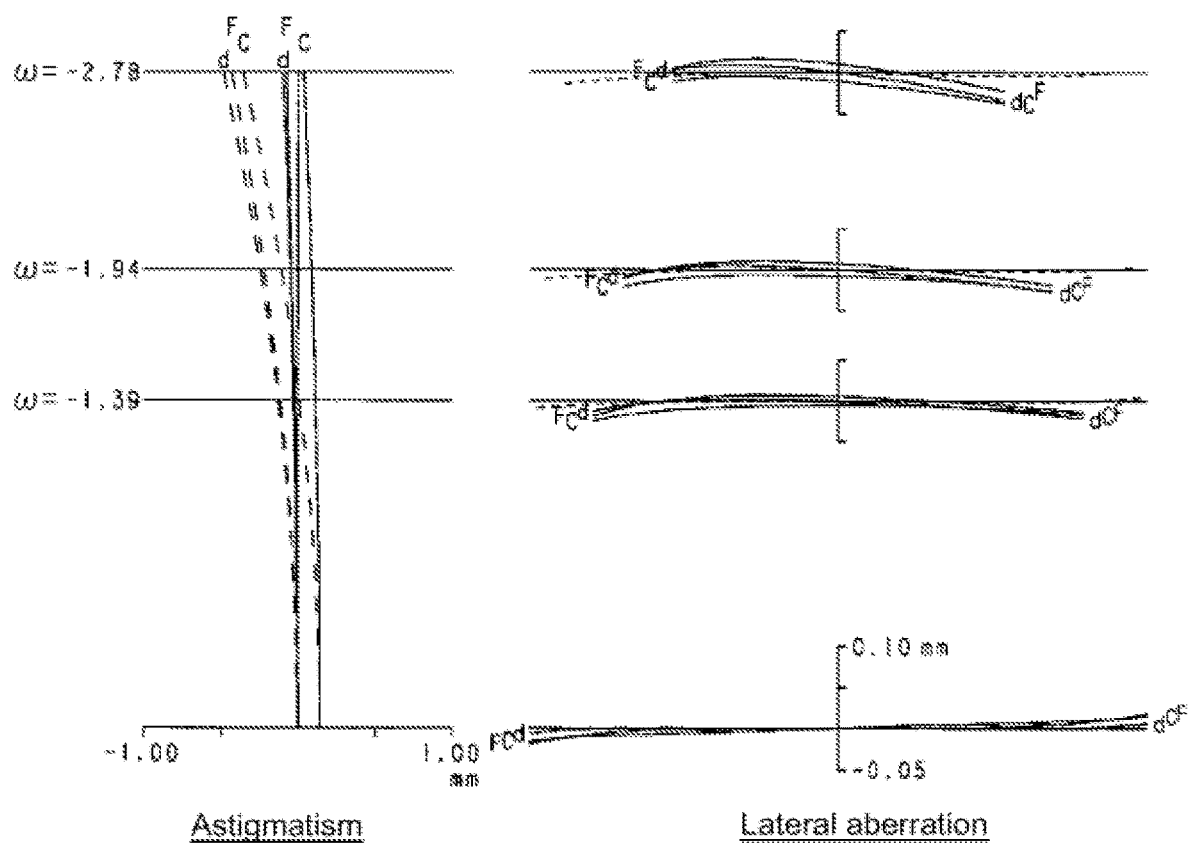
FIG. 3 shows graphs showing various aberrations of the observation optical system in a state in which image blur is not corrected, according to the first example.
Figure 4A:
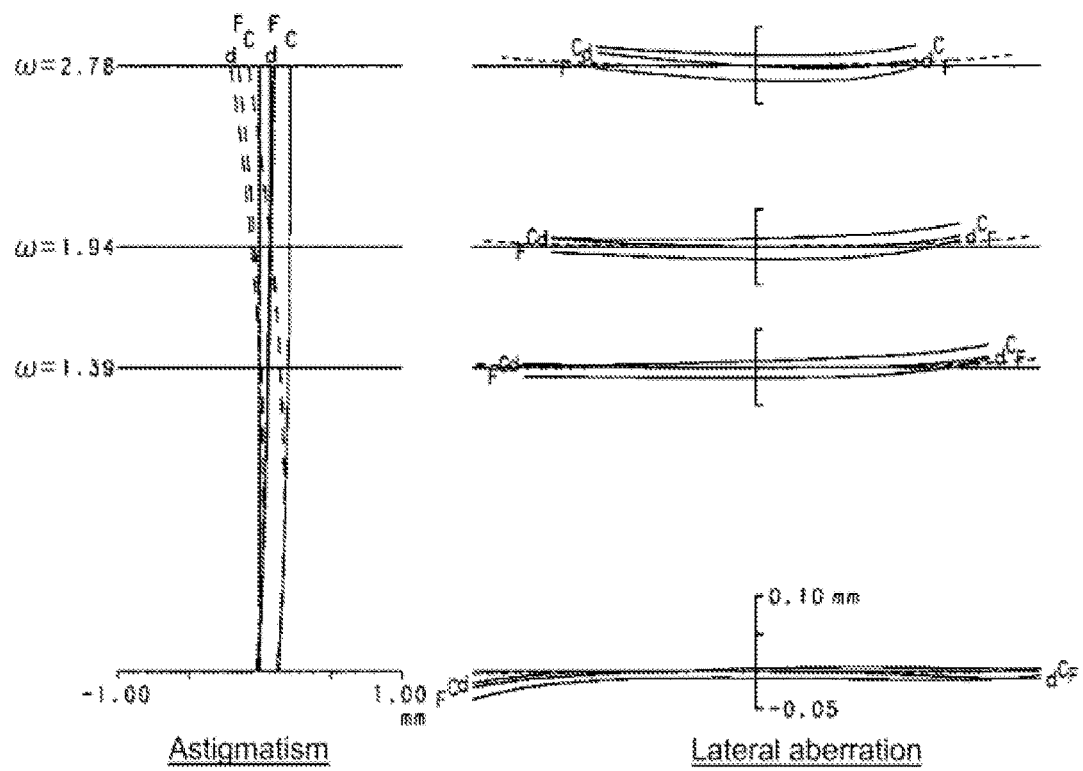
FIGS. 4A and 4B are graphs showing various aberrations of the observation optical system in a state in which image blur is corrected, according to the first example, where
Figure 4B:
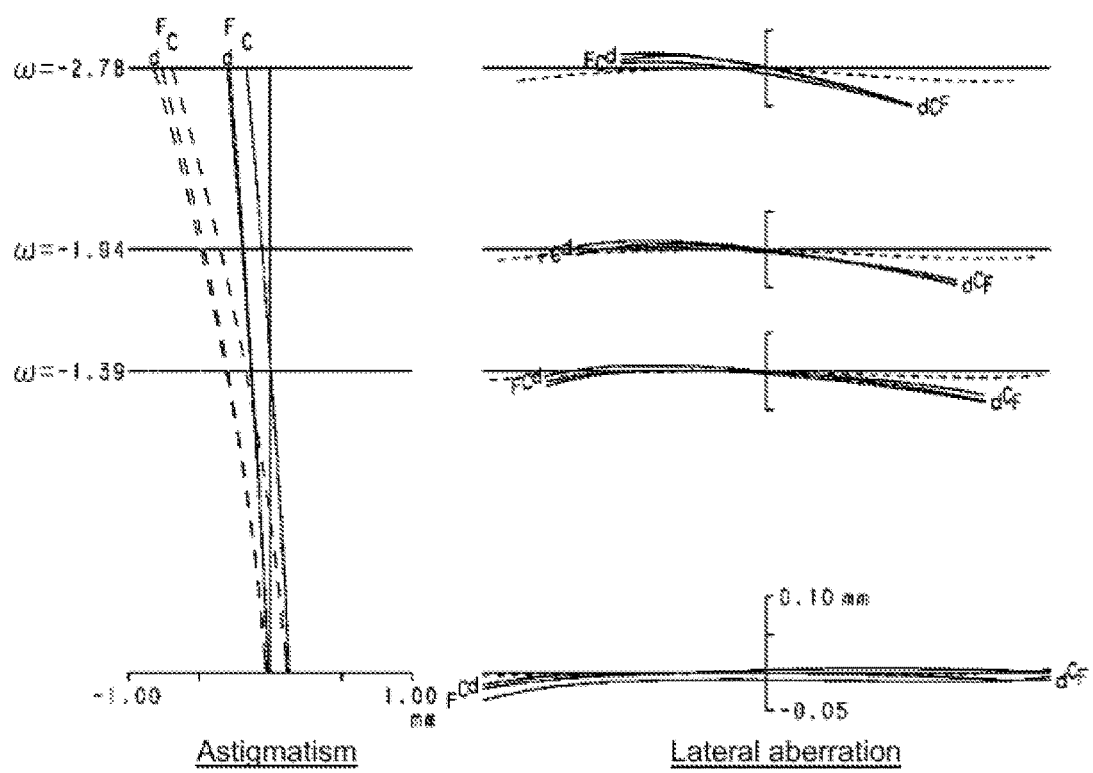

FIG. 2 shows graphs of spherical aberrations of the observation optical system (afocal system) according to the first example. FIG. 3 shows graphs of various aberrations (graphs of astigmatism and graphs of lateral aberrations) of the observation optical system in a state in which image blur is not corrected, according to the first example. FIGS. 4A, and 4B show graphs of various aberrations of the observation optical system in a state in which image blur is corrected (the amount of shift of the third lens group G3=0.6 mm, the vibration proof correction angle=0.48°), according to the first example, where FIG. 4A shows various aberrations corresponding to positive angles of view, and FIG. 4B shows various aberrations corresponding to negative angles of view. In each of the graphs showing aberrations, C denotes various aberrations for the C-line (wavelength λ=656.3 nm), d denotes various aberrations for the d-line (wavelength λ=587.6 nm), and F denotes various aberrations for the F line (wavelength λ=486.1 nm). In the graphs of spherical aberrations, h denotes the height from the optical axis. In the graphs of astigmatism and the graphs of lateral aberrations, ω denotes a half angle of view. In the graphs of astigmatism, a solid line represents a sagittal image surface for each wavelength, and a dashed line represents a meridional image surface for each wavelength. Note that signs that are similar to those in this example will be used in the graphs of aberrations in each of the examples described below and repeated description will be omitted.

In each of the graphs of aberrations, it is possible to ascertain that various aberrations are satisfactorily corrected in both the case in which image blur is not corrected and the case in which image blur is corrected and the observation optical system according to the first example has excellent image forming performance.

Second Example

The second example will be described using FIGS. 5, 6, 7, 8A and 8B and Table 2. FIG. 5 is a sectional view illustrating a configuration of an observation optical system according to the second example of the present embodiment. The observation optical system LS(2) according to the second example is configured of an objective optical system OB through which light from an object (not illustrated) is transmitted, an erecting optical system PR that erect an image formed by the objective optical system OB, and an eyepiece optical system EP for observing the image erected by the erecting optical system PR, the objective optical system OB, the erecting optical system PR, and the eyepiece optical system EP being aligned in order from object.

The objective optical system OB is configured of a first lens group G1 that has positive refractive power, a second lens group G2 that has positive refractive power, and a third lens group G3 that has negative refractive power, the first lens group G1, the second lens group G2, and the third lens group G3 being aligned in order from the object. The first lens group G1 is configured of a cemented lens consisting of a negative meniscus lens L11 having a convex surface facing the object and a biconvex positive lens L12 and a positive meniscus lens L13 having a convex surface facing the object, the negative meniscus lens L11, the positive lens L12, and the positive meniscus lens L13 being aligned in order from the object. The second lens group G2 is configured of a positive meniscus lens L21 having a convex surface facing the object. In other words, the second lens group G2 is configured of a single lens that has positive refractive power. The third lens group G3 is configured of a biconcave negative lens L31. In other words, the third lens group G3 is con figured of a single lens that has negative refractive power.

The erecting optical system PR is configured of an erecting prism us ng an auxiliary prism P1 and a Dach prism P2. The eyepiece optical system EP is configured of a cemented lens consisting of a biconcave negative lens E1 and a biconvex positive lens E2, a cemented lens consisting of a flat concave negative lens E3 having a flat surface facing the object and a biconvex positive lens E4, and a flat convex positive lens E5 having a flat surface facing an eye point, the negative lens E1, the positive lens E2, the negative lens E3, the positive lens E4, and the positive lens E5 being aligned in order from the object. An image forming surface I is disposed between the erecting optical system PR and the eyepiece optical system EP. Note that the auxiliary prism P1 and the Dach prism P2 are schematically illustrated in FIG. 5 for easiness of description.

In this example, in focusing from the state of focusing on infinity to the state of focusing on a short-distance (finite) object, the second lens group G2 as the focusing lens group moves to the side of the object along the optical axis. For example, it is possible to perform focusing from the infinity to the short distance of 3 m, and the amount of movement of the second lens group G2 at this time (in a case in which the amount of movement to the side of the object is represented by a negative (−) value) is −2.86 mm. Also, the third lens group G3 as the vibration proof lens group moves in the direction that is perpendicular to the optical axis to correct image blur on the image forming surface I. The amount of movement (the amount of shift) of the third lens group G3 in the direction that is perpendicular to the optical axis is 0.6 mm, and the amount of correction of image blur (vibration proof correction angle) is 0.42°.

In Table 2 below, data values of the observation optical system according to the second example are listed. Note that the distance from the twenty-first surface to the next lens surface is a distance (eye relief) from the last lens surface (twenty-first surface) to the eye point Eye.

TABLE 2

[General Data]

f = 130.8
f1 = 59.5
f2 = 230
f3 = −32.5
f12 = 50.3

[Lens Data]

| Surface Number | R | D | nd | vd |
|---|---|---|---|---|
| 1 | 91 | 1.5 | 1.8061 | 33.3 |
| 2 | 36.4 | 4.5 | 1.5891 | 61.2 |
| 3 | −135 | 0.5 | | |
| 4 | 28.9 | 3.8 | 1.4875 | 70.3 |
| 5 | 64.2 | 14.9 | | |
| 6 | 50 | 2.4 | 1.5174 | 52.2 |
| 7 | 84.8 | 11.1 | | |
| 8 | −500 | 1.2 | 1.6968 | 55.5 |
| 9 | 23.8 | 6.4 | | |
| 10 | ∞ | 20.2 | 1.5688 | 56 |
| 11 | ∞ | 0.4 | | |
| 12 | ∞ | 32.5 | 1.5168 | 64.1 |
| 13 | ∞ | 14.6 | | |
| 14 | −24.3 | 1.3 | 1.8052 | 25.4 |
| 15 | 107 | 5.7 | 1.5891 | 61.2 |
| 16 | −14.2 | 0.2 | | |
| 17 | ∞ | 1.2 | 1.8467 | 23.8 |
| 18 | 18.9 | 6 | 1.5891 | 61.2 |
| 19 | −23.5 | 0.2 | | |
| 20 | 15.7 | 4.3 | 1.6968 | 55.5 |
| 21 | ∞ | 14.1 | | |

[Conditional Expression Corresponding Value]

Conditional Expression (1) f1/f12 = 1.18
Conditional Expression (2) |f1/f2| = 0.26
Conditional Expression (3) f3/f = −0.25
Conditional Expression (4) f12/f = 0.38
Conditional Expression (5) vd3 = 55.5

Figure 6:
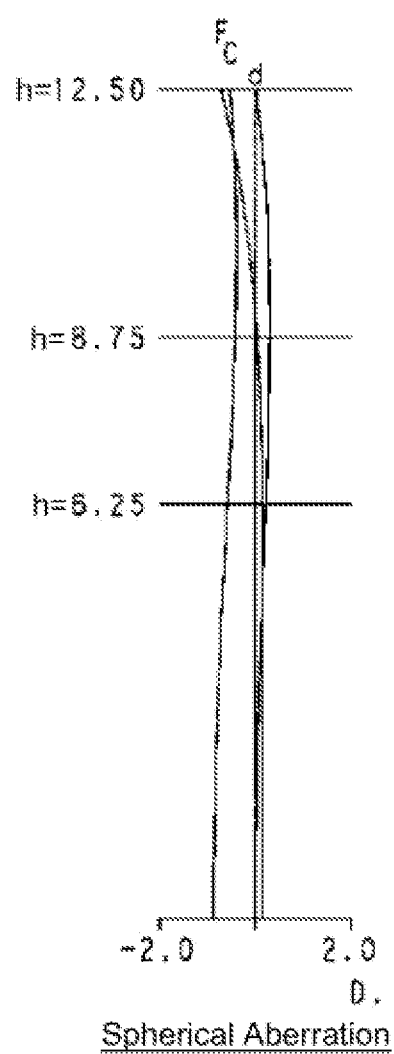
FIG. 6 shows graphs of spherical aberrations of the observation optical system (afocal system) according to the second example.
Figure 7:
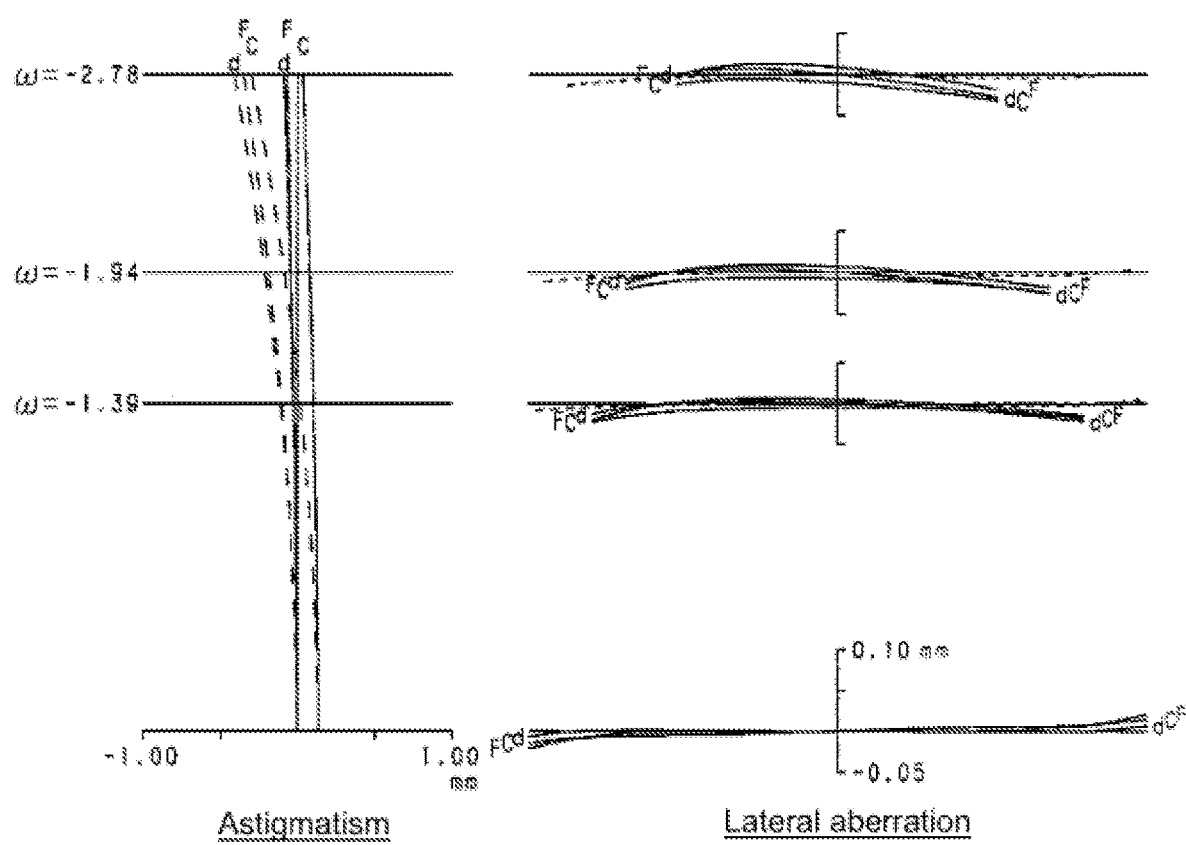
FIG. 7 shows graphs showing various aberrations of the observation optical system in a state in which image blur is not corrected, according to the second example.
Figure 8A:
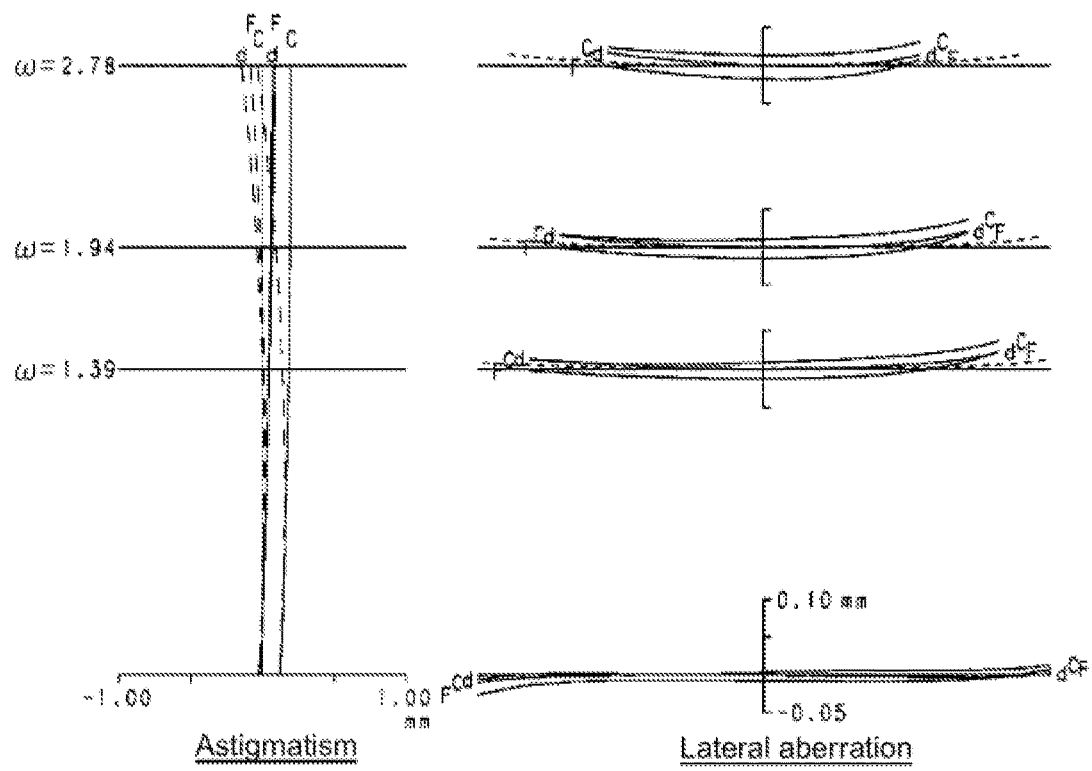
FIGS. 8A and 8B graphs showing various aberrations of the observation optical system in a state in which image blur is corrected, according to the second example, where
Figure 8B:
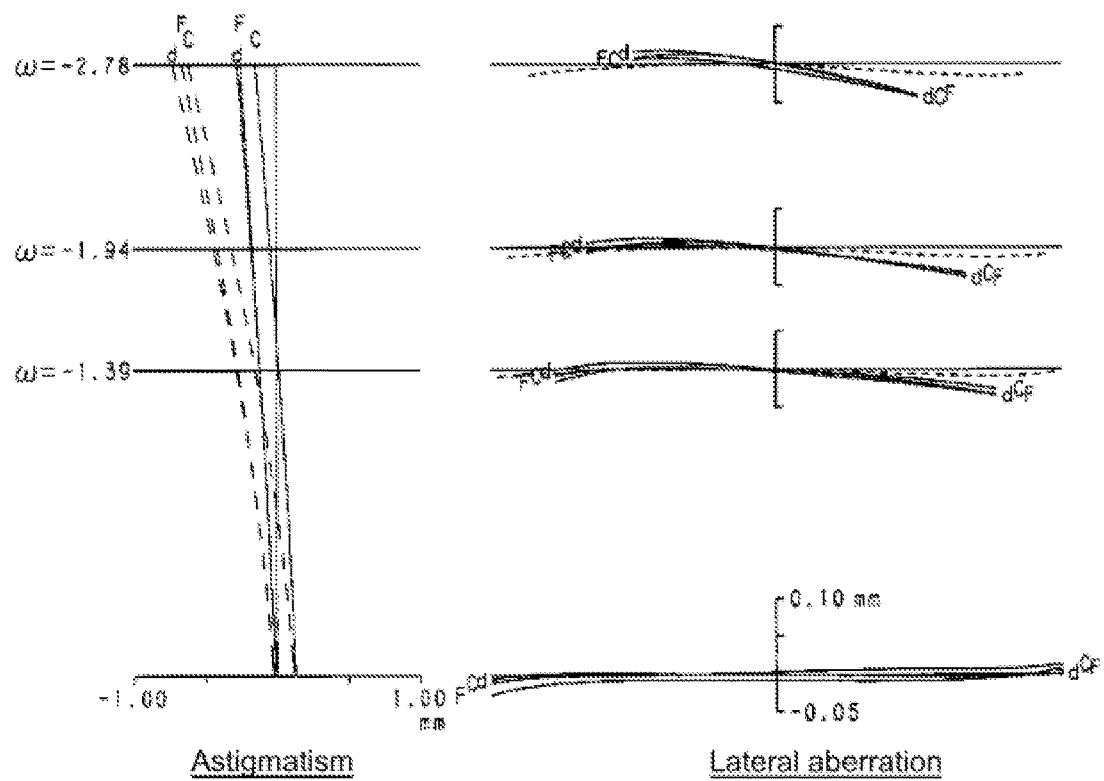

FIG. 6 shows graphs of spherical aberrations of the observation optical system (afocal system) according to the second example. FIG. 7 shows graphs of various aberrations (graphs of astigmatism and graphs of lateral aberrations) of the observation optical system in a state in which image blur is not correct, according to the second example. FIGS. 8A and 8B show graphs of various aberrations of the observation optical system a state in which image blur is corrected (the amount of shift of the third lens group G3=0.6 vibration proof correction angle=0.42°), according to the second example, where FIG. 8A shows various aberrations corresponding to positive angles of view, and FIG. 8B shows various aberrations corresponding to negative angles of view. In each of the graphs of aberrations, it is possible to ascertain that various aberrations are satisfactorily corrected in both the case in which image blur is not corrected and the case in which image blur is corrected and the observation optical system according to the second example has excellent image forming performance.

Third Example

The third example will be described with reference to FIGS. 9, 10, 11, 12A and 12B and Table 3. FIG. 9 is a sectional view illustrating a configuration of an observation optical system according to the third example of the present embodiment. The observation optical system LS(3) according to the third example is configured of an objective optical system OB through which light from an object (not illustrated) is transmitted, an erecting optical system PR that erects an image formed by the objective optical system OB, and an eyepiece optical system EP for observing the image erected by the erecting optical system PR, the objective optical system OB, the erecting optical system PR, and the eyepiece optical system EP being aligned in order from the object.

The objective optical system OB is configured of a first lens group G1 that has positive refractive power, a second lens group G2 that has negative refractive power, and a third lens group G3 that has negative refractive power, the first lens group G1, the second lens group G2, and the third lens group G3 being aligned in order from the object. The first lens group G1 is configured of cemented lens consisting of a negative meniscus lens L11 having a convex surface facing the object and a biconvex positive lens L12 and a positive meniscus lens L13 having a convex surface facing the object, the negative meniscus lens L11, the positive lens L12, and the positive meniscus lens L13 being aligned in order from the object. The second lens group G2 is configured of a negative meniscus lens L21 having a convex surface facing the object. In other words, the second lens group G2 is configured of a single lens that has negative refractive power. The third lens group G3 is configured of a biconcave negative lens L31. In other words, the third lens group G3 is configured of a single lens that has negative refractive power.

The erecting optical system PR is a configured of an erecting prism using an auxiliary prism P1 and a Dach prism P2. The eyepiece optical system EP is configured of a cemented lens consisting of a biconcave negative lens E1 and a bioconvex positive lens E2, a cemented lens consisting of a flat concave negative lens E3 having a flat surface facing the object and a biconvex positive lens E4, and a flat convex positive lens E5 having a flat surface facing an eye point, the negative lens E1, the positive lens E2, the negative lens E3, the positive lens E4, and the positive lens E5 being aligned in order from the object. An image forming surface I is disposed between the erecting optical system PR and the eyepiece optical system EP. Note that the auxiliary prism P1 and the Dach prism P2 are schematically illustrated in FIG. 9 for easiness of description.

In this example, in focusing from the state of focusing on infinity to the state of focusing on a short-distance (finite) object, the second lens group G2 as the focusing lens group moves to the side of the object along the optical axis. For example, it possible to perform focusing from the infinity to the short distance of 3 m, and the amount of movement of the second lens group G2 at this tam (in a case in which the unit of movement to the side of the object represented by a negative (−) value) is +3.00 mm. Also, the third lens group G3 as the vibration proof lens group moves in the direction that is perpendicular to the optical axis to correct image blur on the image forming surface I. The amount of movement (the amount of shift) of the third lens group G3 in the direction that is perpendicular to the optical axis is 0.6 mm, and the amount of correction of image blur (vibration proof correction angle) is 0.52°.

In Table 3 below, data values of the observation optical system according to the third example are listed. Note that the distance from the twenty-first surface to the next lens surface is a distance a (eye relief) from the last lens surface (twenty-first surface) to the eye point Eye.

TABLE 3

[General Data]

f = 129.8
f1 = 39.7
f2 = −260
f3 = −27
f12 = 44

[Lens Data]

| Surface Number | R | D | nd | vd |
|---|---|---|---|---|
| 1 | 60 | 1.5 | 1.7205 | 34.7 |
| 2 | 28 | 4.8 | 1.603 | 65.4 |
| 3 | −480 | 0.5 | | |
| 4 | 26.8 | 4.5 | 1.4875 | 70.3 |
| 5 | 315 | 7.1 | | |
| 6 | 250.8 | 2.4 | 1.5174 | 52.2 |
| 7 | 87.3 | 10.5 | | |
| 8 | −180 | 1.2 | 1.6968 | 55.5 |
| 9 | 21.1 | 6.4 | | |
| 10 | ∞ | 20.2 | 1.5688 | 56 |
| 11 | ∞ | 0.4 | | |
| 12 | ∞ | 32.5 | 1.5168 | 64.1 |
| 13 | ∞ | 15.5 | | |
| 14 | −28.4 | 1.3 | 1.8052 | 25.4 |
| 15 | 107 | 5.5 | 1.5891 | 61.2 |
| 16 | −14.6 | 0.2 | | |
| 17 | ∞ | 1.2 | 1.8467 | 23.8 |
| 18 | 16.8 | 6 | 1.5891 | 61.2 |
| 19 | −23.5 | 0.2 | | |
| 20 | 15.3 | 4.4 | 1.6968 | 55.5 |
| 21 | ∞ | 13.8 | | |

[Conditional Expression Corresponding Value]

Conditional Expression (1) f1/f12 = 0.90
Conditional Expression (2) |f1/f2| = 0.15
Conditional Expression (3) f3/f = −0.21
Conditional Expression (4) f12/f = 0.34
Conditional Expression (5) vd3 = 55.5

Figure 10:
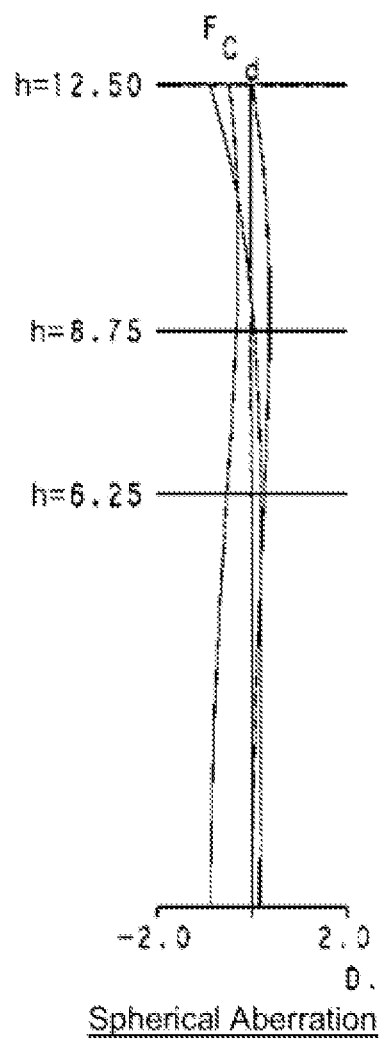
FIG. 10 shows graphs of spherical aberrations of the observation optical system (afocal system) according to the third example.
Figure 11:
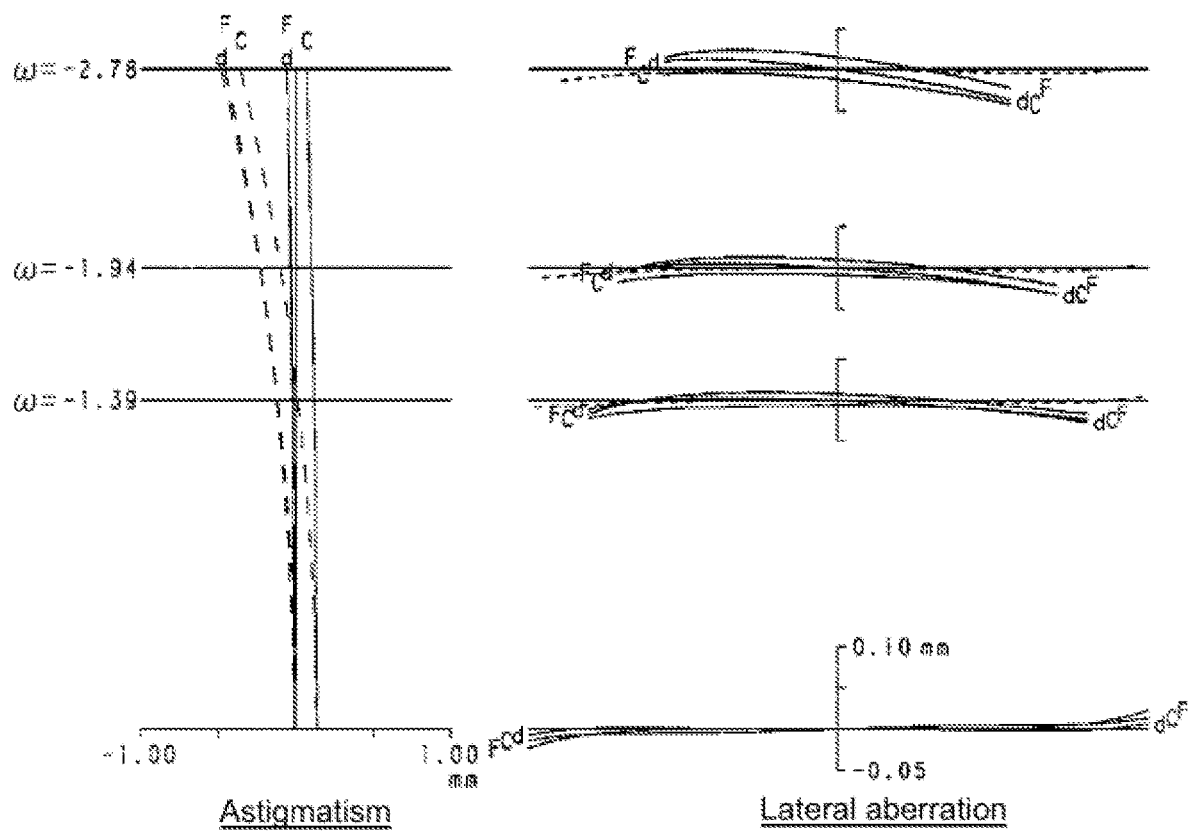
FIG. 11 shows graphs showing various aberrations of the observation optical system in a state in which image blur is not corrected, according to the third example.
Figure 12A:
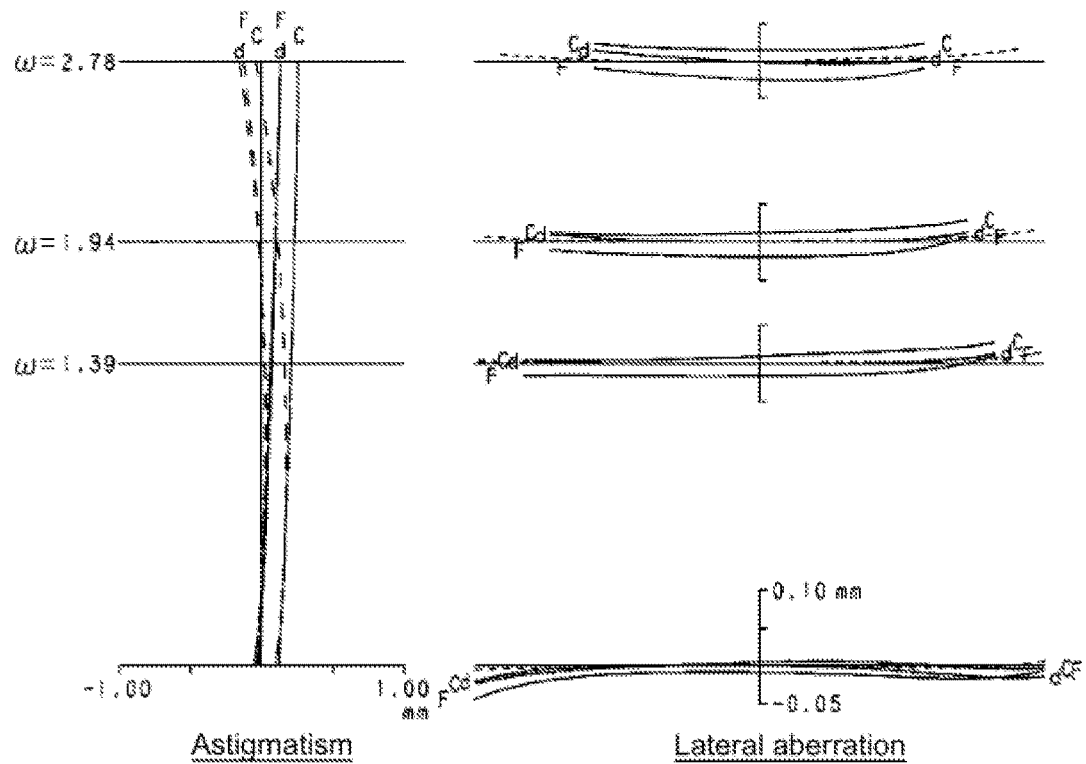
FIGS. 12A and 12B are graphs showing various aberrations the observation optical system in a state in which image blur is corrected, according to the third example, where
Figure 12B:
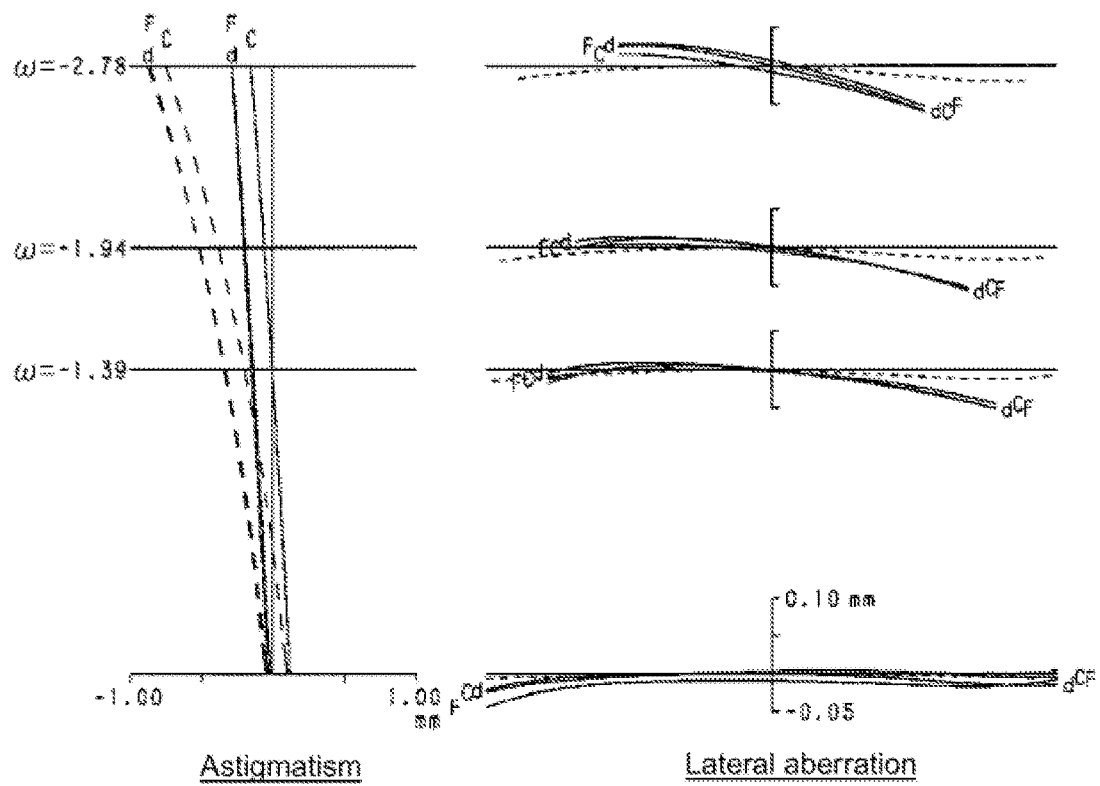

FIG. 10 shows graphs of spherical aberrations of the observation optical system (afocal system) according to the third example. FIG. 11 shows graphs of various aberrations (graphs of astigmatism and graphs of lateral aberrations) of the observation optical system in a state in which image blur is not corrected, according to the third example. FIGS. 12A and 12B show graphs of various aberrations of the observation optical system in a state in which image blur is corrected (the amount of shift of the third lens group G3=0.6 mm, the vibration proof correction angle=0.52°), according to the third example, where FIG. 12A shows various aberrations corresponding to positive angles of view, and FIG. 12B shows various aberrations corresponding to negative angles of view. In each of the graphs of aberrations, it is possible to ascertain that various aberrations are satisfactorily corrected in both the case in which image blur is not corrected and the case in which image blur is corrected and the observation optical system according to the third example has excellent image forming performance.

Fourth Example

The fourth example will be described using FIGS. 13, 14, 15, 16A and 16B and Table 4. FIG. 13 is a sectional view illustrating a configuration of an observation optical system according to the fourth example of the present embodiment. The observation optical system LS(4) according to the fourth example is configured of an objective optical system OB through which light from an object (not illustrated) is transmitted, an erecting optical system PR that erects an image formed by the objective optical system OB, and an eyepiece optical system EP for observing the image erected by the erecting optical system PR, the objective optical system OB, the erecting optical system PR, and the eyepiece optical system EP being aligned in order from the object.

The objective optical system OB is configured of a first lens group G1 that has positive refractive power, a second lens group G2 that has positive refractive power, and a third lens group G3 that has negative refractive power, the first lens group G1, the second lens group G2, and the third lens group G3 being aligned in order from the object. The first lens group G1 is configured of a cemented lens consisting of a negative meniscus lens L11 having a convex surface facing the object and a biconvex positive lens L12 and a positive meniscus lens L13 having a convex surface facing the object, the negative meniscus lens L11, the positive lens L12, and the positive meniscus lens L13 being aligned in order from the object. The second lens group G2 is configured of a positive meniscus lens L21 having a convex surface facing the object. In other words, the second lens group G2 is configured of a single lens that has positive refractive power. The third lens group G3 is configured of a biconcave negative lens L31. In other wards, the third lens group G3 is configured of a single lens that has negative refractive power.

The erecting optical system PR is configured of an erecting prism using an auxiliary prism P1 and a Dash prism P2. The eyepiece optical system EP is configured of a cemented lens consisting of a positive meniscus lens E1 having a concave surface facing the object and a flat concave negative lens E2 having a flat surface facing an eye point, a positive meniscus lens E3 having a concave surface facing the object, a cemented lens consisting of a flat concave negative lens E4 having a flat surface facing the object and a biconvex positive lens E5, and a biconvex positive lens E6, the positive meniscus lens E1, the negative lens E2, the positive meniscus lens E3, the negative lens E4, the positive lens E5, and the positive lens E6 being aligned in order from the object. An image forming surface I is disposed between the negative lens E2 (of the cemented lens) and the positive meniscus lens E3 in the eyepiece optical system EP. It is possible to extend the distance (eye relief) from the last lens surface to the eye point Eye by disposing the cemented lens (the positive meniscus lens E1 and the negative lens E2) that has negative refractive power between the erecting optical system PR and the image forming surface I, and it is possible to achieve a so-called high-eye-point eyepiece optical system. Note that the auxiliary prism P1 and the Dach prism P2 are schematically illustrated in FIG. 13 for easiness of description.

In this example, using from the state of focusing on infinity to the state of focusing on a short-distance (finite) object, the second lens group G2 as the focusing lens group moves to the side of the object along the optical axis. For example, it is possible to perform focusing from the infinity to the short distance of 3m, and the amount of movement of the second lens group G2 at this time (in a case in which the amount movement to the side of the object is represented by a negative (−) value) is −5.73 mm. Also, the third lens group G3 as the vibration proof lens group moves in the direction that is perpendicular to the optical axis to correct image blur on the image forming surface I. The amount of movement (the amount of shift) of the third lens group G3 in the direction that is perpendicular to the optical axis is 0.6 mm, and the amount of correct ion of image blur (vibration proof correction angle) is 0.42°.

In Table 4 below, data values of the observation optical system according to the fourth example are listed. Note that the distance from the twenty-third surface to the next lens surface is a distance (eye relief) from the last lens surface (twenty-third surface) to the eye point Eye.

TABLE 4

[General Data]

f = 135.8
f1 = 54.8
f2 = 520
f3 = −34.5
f12 = 50.8

[Lens Data]

| Surface Number | R | D | nd | vd |
|---|---|---|---|---|
| 1 | 90.2 | 2 | 1.8061 | 33.3 |
| 2 | 36.2 | 5.6 | 1.5891 | 61.2 |
| 3 | −222.7 | 0.5 | | |
| 4 | 31.3 | 5 | 1.4875 | 70.3 |
| 5 | 174.1 | 12.3 | | |
| 6 | 83.6 | 2.4 | 1.5174 | 52.2 |
| 7 | 120 | 10.6 | | |
| 8 | −200 | 1.2 | 1.603 | 65.4 |
| 9 | 23.3 | 10 | | |
| 10 | ∞ | 21.9 | 1.5688 | 56 |
| 11 | ∞ | 0.4 | | |
| 12 | ∞ | 36.4 | 1.5168 | 64.1 |
| 13 | ∞ | 5 | | |
| 14 | −21 | 2.5 | 1.8052 | 25.4 |
| 15 | −12 | 1 | 1.5168 | 64.1 |
| 16 | ∞ | 9.5 | | |
| 17 | −191 | 4.4 | 1.5891 | 61.2 |
| 18 | −21 | 0.2 | | |
| 19 | ∞ | 1.3 | 1.8467 | 23.8 |
| 20 | 17.6 | 7.5 | 1.5891 | 61.2 |
| 21 | −29.5 | 0.2 | | |
| 22 | 20.4 | 5 | 1.6968 | 55.5 |
| 23 | −91.6 | 15.2 | | |

[Conditional Expression Corresponding Value]

Conditional Expression (1) f1/f12 = 1.08
Conditional Expression (2) |f1/f2| = 0.11
Conditional Expression (3) f3/f = −0.25

TABLE 4-continued

Conditional Expression (4) f12/f = 0.37
Conditional Expression (5) vd3 = 65.4

Figure 14:
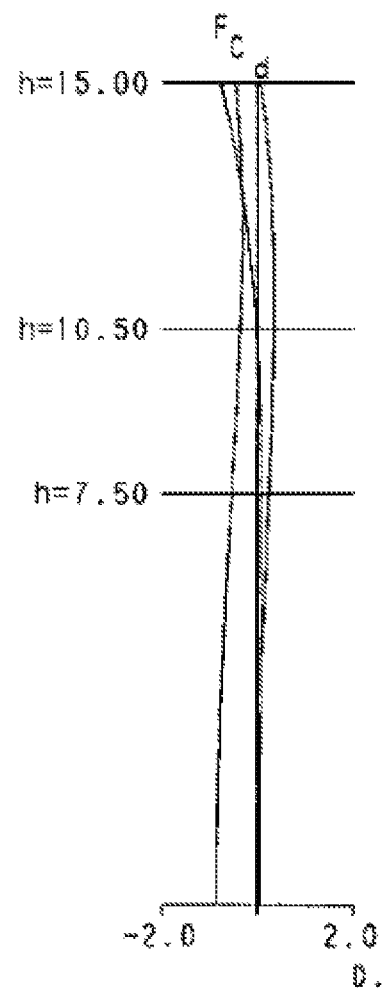
FIG. 14 shows graphs of spherical aberrations observation optical system (afocal system) according to the fourth example.
Figure 15:
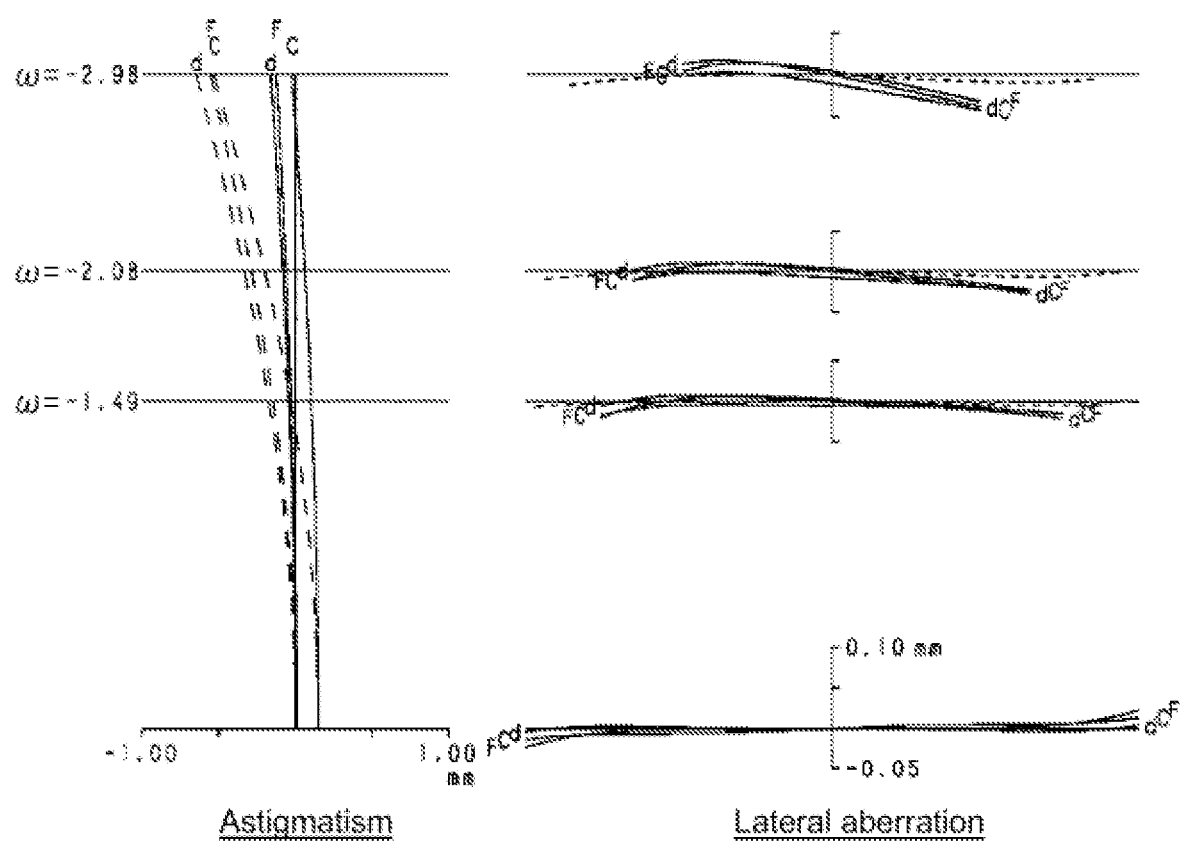
FIG. 15 shows graphs of various aberrations of the observation optical system in a state in which image blur is not corrected, according to the fourth example.
Figure 16A:
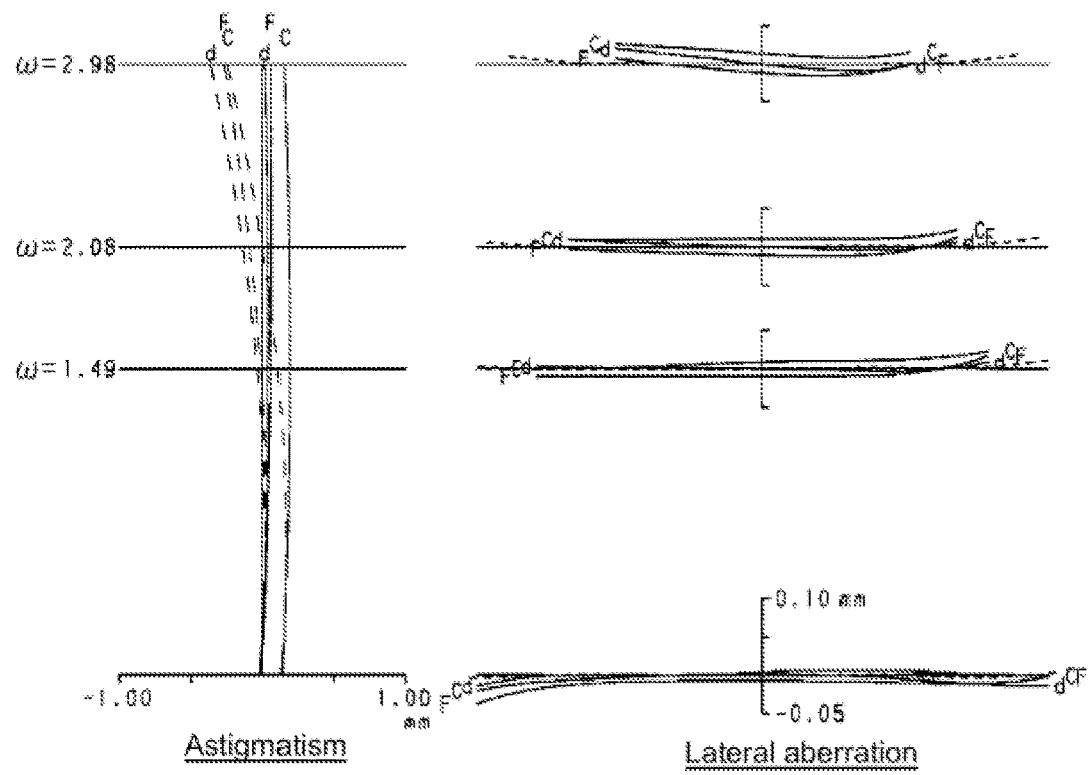
FIGS. 16A and 16B are graphs showing various aberrations of the observation optical system in a state in which image blur is corrected, according to the fourth example, where
Figure 16B:
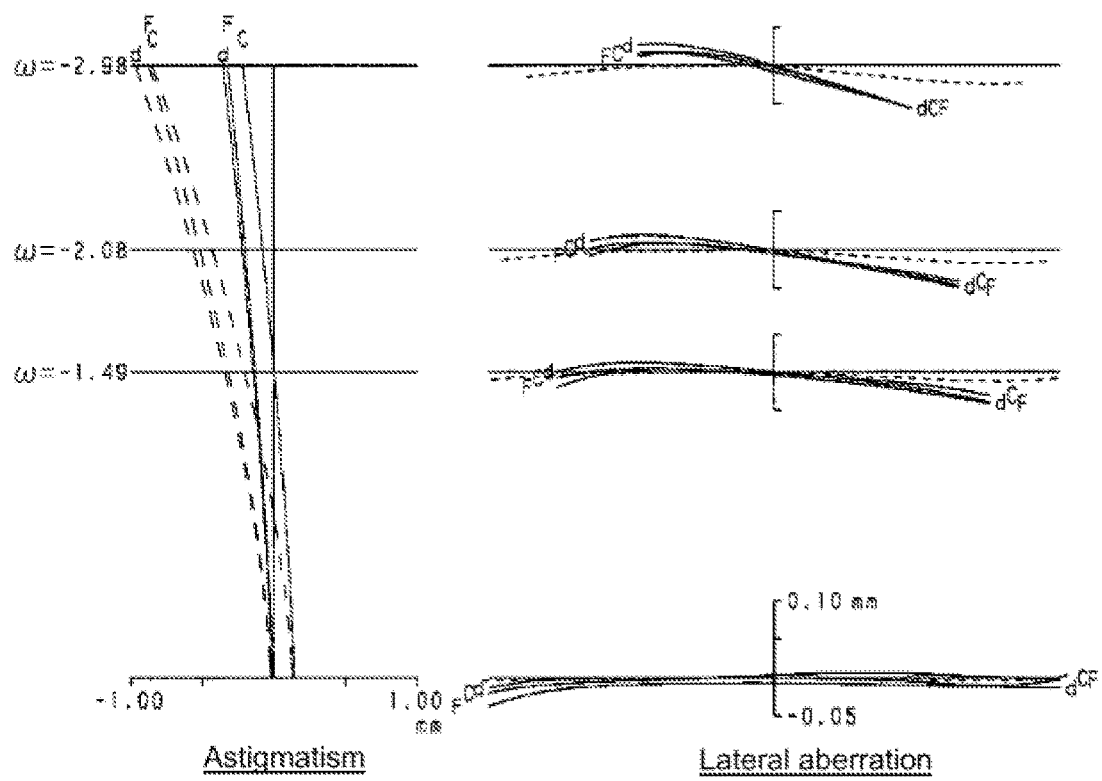

FIG. 14 shows graphs of spherical aberrations of the observation optical system (afocal system) according to the fourth example. FIG. 15 shows graphs of various aberrations (graphs of astigmatism and graphs of lateral aberrations) of the observation optical system in state in which image blur is not corrected, according to the fourth example. FIGS. 16A and 16B show graphs of various aberrations of the observation optical system a state in which image blur is corrected (the amount of shift of the third lens group G3=0.6 mm, the vibration proof correction angle=0.42°), according to the fourth example, where FIG. 16A shows various aberrations corresponding to positive angles of view, and FIG. 16B shows various aberrations corresponding to negative angles of view. In each of the graphs of aberrations, it is possible ascertain that various aberrations are satisfactorily corrected in both the case in which image blur is not corrected and the case in which image blur is corrected and the observation optical system according to the fourth example has excellent image forming performance.

Fifth Example

The fifth example will be described using FIGS. 17, 18, 19, 20A and 20B and Table 5. FIG. 17 is a sectional view illustrating a configuration of an observation optical system according to the fifth example of the present embodiment. The observation optical system LS(5) according to the fifth example is configured of an objective optical system OB through which light from an object (not illustrated) is transmitted, an erecting optical system PR that erects an image formed by the objective optical system OB, and an eyepiece optical system EP for observing the image erected by the erecting optical system PR, the objective optical system OB, the erecting optical system PR, and the eyepiece optical system EP being aligned in order from the object.

The objective optical system OB is configured of a first lens group G1 that has positive refractive power, a second lens group G2 that has positive refractive power, and a third lens group G3 that has negative refractive power, the first lens group G1, the second lens group G2, and the third lens group G3 being aligned in order from the object. The first lens group G1 is configured of cemented lens consisting of a biconvex positive lens L11 and a negative meniscus lens L12 having a concave surface facing the object and a biconvex positive lens L13, the positive lens L11, the negative meniscus lens L12, and the positive lens L13 being aligned in order from the object. The second lens group G2 is configured of a positive meniscus lens L21 having a convex surface facing the object. In other words, the second lens group G2 is configured of a single lens that has positive refractive power. The third lens group G3 is configured of a cemented lens consisting of a positive meniscus lens L31 having a concave surface facing the object and a biconcave negative lens L32. In other words, the third lens group is configured of one cemented lens that has negative refractive power.

The erecting optical system PR is configured of an erecting prism using an auxiliary prism P1 and a Dach prism P2. The eyepiece optical system EP is configured of a biconcave negative lens E1, a positive meniscus lens E2 having a concave surface facing the object, a cemented lens consisting of a biconcave negative lens E3 and a biconvex positive lens E4, a biconvex positive lens E5, the negative lens E1, the positive meniscus lens E2, the negative lens E3, the positive lens E4, and the positive lens E5 being aligned in order from the object. An image forming surface I is disposed between the negative lens E1 and the positive meniscus lens E2 in the eyepiece optical system EP. It is possible to extend the distance (eye relief) from the last lens surface to the eye point Eye by disposing the single lens (the negative lens E1) that has negative refractive power between the erecting optical system PR and the image forming surface I, and it is possible to achieve a so-called high-eye-point eyepiece optical system. Note that the auxiliary prism P1 and the Dach prism P2 are schematically illustrated in FIG. 17 for easiness of description.

In this example, in focusing from the state of focusing on infinity to the state of focusing on a short-distance (finite) object, the second lens group G2 as the focusing lens group moves to the side of the object along the optical axis. For example, it is possible to perform focusing from the infinity to the short distance of 3 m, and the amount of movement of the second lens group G2 at this time (in a case in which the amount of movement to the side of the object is represented by a negative (−) value) is −3.18 mm. Also, the third lens group G3 as the vibration proof lens group moves in the direction that is perpendicular to the optical axis to correct image blur on the image forming surface I. The amount of movement (the amount of shift) of the third lens group G3 in the direction that is perpendicular to the optical axis is 0.6 mm, and the amount of correction of image blur (vibration proof correction angle) is 0.50°.

In Table 5 below, data values of the observation optical system according to the fifth example are listed. Note that the distance from the twenty-third surface to the next lens surface is a distance (eye relief) from the last lens surface (twenty-third surface) to the eye point Eye.

TABLE 5

[General Data]

f = 135.8
f1 = 51
f2 = 300
f3 = −29
f12 = 45.4

[Lens Data]

| Surface Number | R | D | nd | vd |
|---|---|---|---|---|
| 1 | 84 | 6 | 1.5168 | 64.1 |
| 2 | −42.1 | 1.5 | 1.7205 | 34.7 |
| 3 | −188.4 | 0.5 | | |
| 4 | 36.8 | 5.2 | 1.5168 | 64.1 |
| 5 | −599 | 13.2 | | |
| 6 | 44.9 | 2.4 | 1.5168 | 64.1 |
| 7 | 62 | 7 | | |
| 8 | −213.2 | 1.3 | 1.8052 | 25.3 |
| 9 | −118.3 | 1 | 1.717 | 48 |
| 10 | 22.9 | 10 | | |
| 11 | ∞ | 21.9 | 1.5688 | 56 |
| 12 | ∞ | 0.4 | | |
| 13 | ∞ | 36.4 | 1.5168 | 64.1 |
| 14 | ∞ | 4.7 | | |
| 15 | −33 | 1.5 | 1.5168 | 64.1 |
| 16 | 160 | 10.6 | | |
| 17 | −143.6 | 5 | 1.6968 | 55.5 |
| 18 | −17.8 | 0.2 | | |

TABLE 5-continued

| 19 | −258.5 | 1.5 | 1.8467 | 23.8 |
|---|---|---|---|---|
| 20 | 15.3 | 8 | 1.603 | 65.5 |
| 21 | −36.5 | 0.2 | | |
| 22 | 16.5 | 5.7 | 1.6204 | 60.1 |
| 23 | −149.1 | 14.4 | | |

[Conditional Expression Corresponding Value]

Conditional Expression (1) f1/f12 = 1.12
Conditional Expression (2) |f1/f2| = 0.17
Conditional Expression (3) f3/f = −0.21
Conditional Expression (4) f12/f = 0.33

Figure 18:
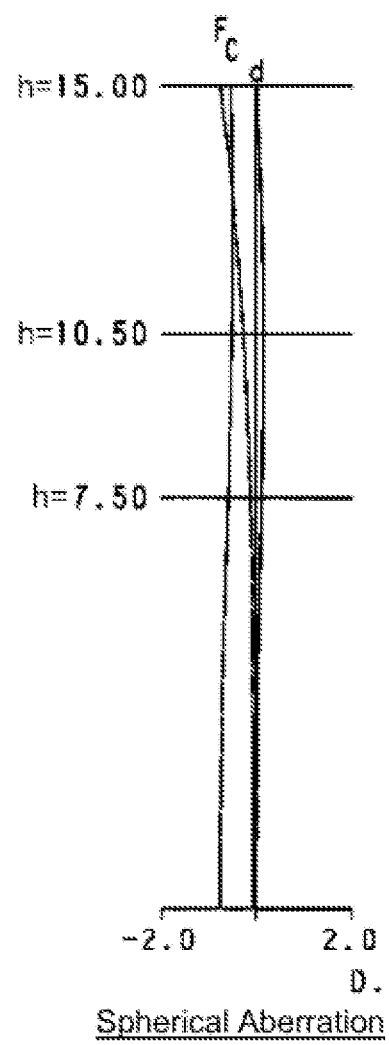
FIG. 18 shows graphs of spherical aberrations of the observation optical system (afocal system) according to the fifth example.
Figure 19:
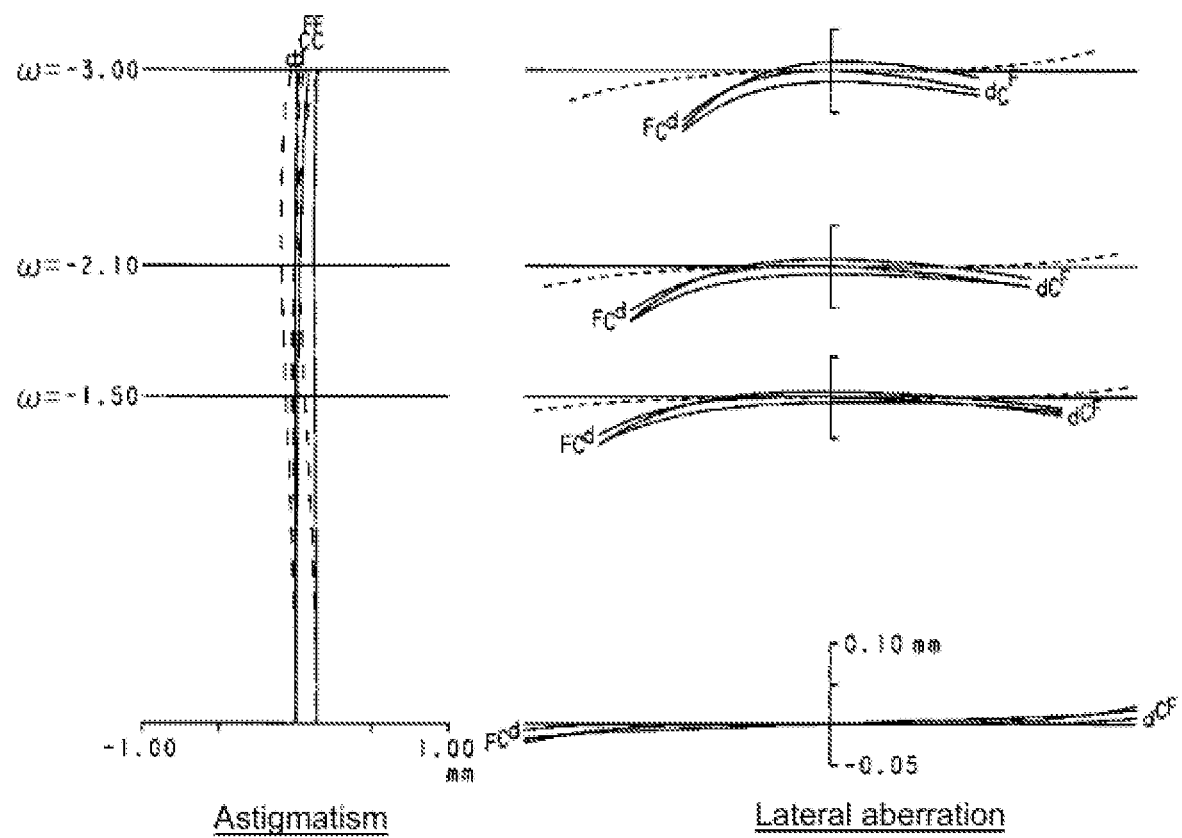
FIG. 19 shows graphs of various aberrations of the observation optical system in a state in which image blur is not corrected, according to the fifth example.
Figure 20A:
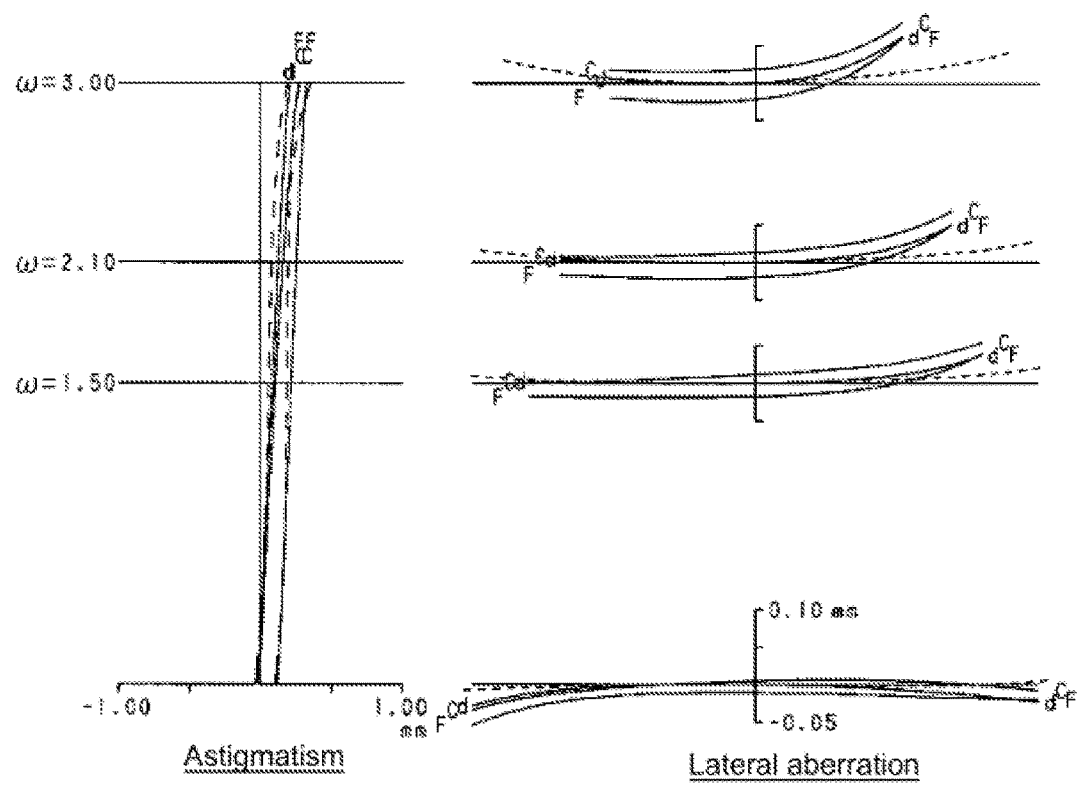
Figure 20B:
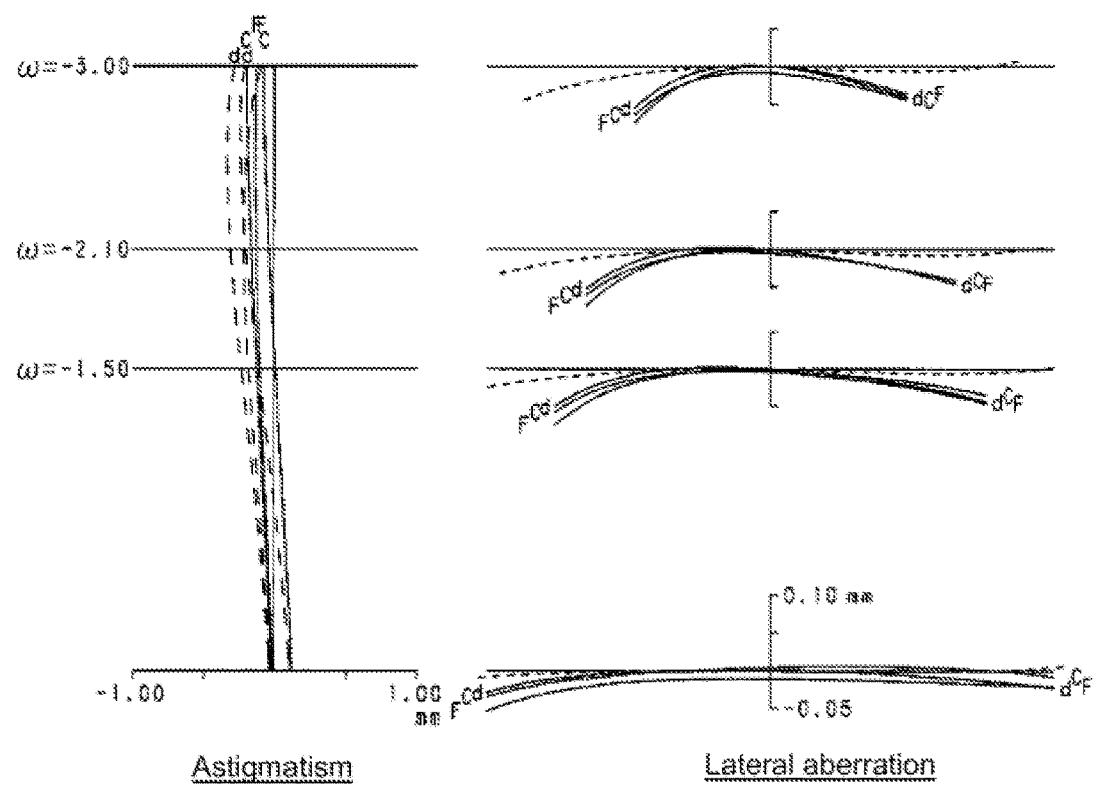

FIG. 18 shows graphs of spherical aberrations of the observation optical system (afocal system) according to the fifth example. FIG. 19 shows graphs of various aberrations (graphs of astigmatism and graphs of lateral aberrations) of the observation optical system in a state in which image blur is not corrected, according to the fifth example. FIGS. 20A and 20B show graphs of various aberrations of the observation optical system in a state in which image blur is corrected (the amount of shift of the third lens group G3=0.6 mm, the vibration proof correction angle=0.50°), according to the fifth example, where FIG. 20A shows various aberrations corresponding to positive angles of view, and FIG. 20B shows various aberrations corresponding to negative angles of view. In each of the graphs of aberrations, it is possible to ascertain that various aberrations are satisfactorily corrected in both the case in which image blur is not corrected and the case in which image blur is corrected and the observation optical system according to the fifth example has excellent image forming performance.

Sixth Example

The sixth example will described using FIGS. 21, 22, 23, 24A and 24B and Table 6 FIG. 1 is a sectional view illustrating a configuration of an observation optical system according to the sixth example of the present embodiment. The observation optical system LS(6) according to the sixth example is configured of an objective optical system OB through which light from an object (not illustrated) is transmitted, an erecting optical system PR that erects an image formed by the objective optical system OB and an eyepiece optical system EP for observing the image erected by the erecting optical system PR, the objective optical system OB, the erecting optical system PR, and the eyepiece optical system EP being aligned in order from the object.

The objective optical system OB is configured of a first lens group G1 that has positive refractive power, a second lens group G2 that has positive refractive power, and a third lens group G3 that has negative refractive power, the first lens group G1, the second lens group G2, and the third lens group G3 being aligned in order from the object. The first lens group G1 is configured of a cemented lens consisting of a negative meniscus lens L11 having a convex surface facing the object and a biconvex positive lens L12 and a positive meniscus lens L13 having a convex surface facing the object, the negative meniscus lens L11, the positive lens L12, and the positive meniscus lens L13 being aligned in order from the object. The second lens group G2 is configured of a positive meniscus lens L21 having a convex surface facing the object. In other words, the second lens group G2 is configured of a single lens that has positive refractive power. The third lens group G3 is configured of a biconcave negative lens L31. In other words, the third lens group G3 is configured of a single lens that has negative refractive power.

The erecting optical system PR is configured of an erecting prism using an auxiliary prism P1 and a Dash prism P2. The eyepiece optical system EP is configured of a cemented lens consisting of a positive meniscus lens E1 having a concave surface facing the object and a flat concave negative lens E2 having a flat surface facing an eye point, a positive meniscus lens E3 having a concave surface facing the object, a cemented lens consisting of a flat concave negative lens E4 having a flat surface facing the object and a biconvex positive lens E5, and a biconvex positive lens E6, the positive meniscus lens E1, the negative lens E2, the positive meniscus lens E3, the negative lens E4, the positive lens E5, and the positive lens E6 being aligned in order from the object. An image forming surface I is disposed between the negative lens E2 (of the cemented lens) and the positive meniscus lens E3 in the eyepiece optical system EP. It is possible to extend the distance (eye relief) from the last lens surface to the eye point Eye by disposing the cemented lens (the positive meniscus lens E1 and the negative lens E2) that has negative refractive power between the erecting optical system PR and the image forming surface I, and it is possible to achieve a so-called high-eye-point eyepiece optical system. Note that the auxiliary prism P1 and the Dach prism P2 are schematically illustrated in FIG. 21 for easiness of description.

In this example, in focusing from the state of focusing on infinity to the state of focusing on a short-distance (finite) object, the second lens group G2 as the focusing lens group moves to the side of the object along the optical axis. For example, it is possible to perform focusing from the infinity to the short distance of 3 m, and the amount of movement of the second lens group G2 at this time (in a case in which the amount of movement to the side of the object is represented by a negative (−) value) is −3.11 mm. Also, the third lens group G3 as the vibration proof lens group moves in the direction that is perpendicular to the optical axis correct image blur on the image forming surface I. The amount of movement (the amount of shift) of the third lens group G3 in the direction that is perpendicular to the optical axis is 0.6 mm, and the mount of correction of image blur (vibration proof correction angle) is 0.31°.

In Table 6 below, data values of the observation optical system according to the sixth example are listed. Note that the distance from the twenty-third surface to the next lens surface is a distance (eye relief) from the last lens surface (twenty-third surface) to the eye point Eye.

TABLE 6

[General Data]

f = 136
f1 = 78
f2 = 200
f3 = −47
f12 = 61

[Lens Data]

| Surface Number | R | D | nd | vd |
| --- | --- | --- | --- | --- |
| 1 | 127.7 | 2 | 1.8061 | 33.3 |
| 2 | 44.5 | 5 | 1.5891 | 61.2 |
| 3 | −200 | 0.5 | | |
| 4 | 36.9 | 4 | 1.5168 | 64.1 |

TABLE 6-continued

| | | | | |
| --- | --- | --- | --- | --- |
| 5 | 90.2 | 18.2 | | |
| 6 | 68.9 | 2.4 | 1.5168 | 64.1 |
| 7 | 204.5 | 14.7 | | |
| 8 | −200 | 1.2 | 1.5891 | 61.2 |
| 9 | 32.2 | 10 | | |
| 10 | ∞ | 21.9 | 1.5688 | 56 |
| 11 | ∞ | 0.4 | | |
| 12 | ∞ | 36.4 | 1.5168 | 64.1 |
| 13 | ∞ | 5.2 | | |
| 14 | −20.1 | 2.5 | 1.8052 | 25.4 |
| 15 | −12 | 1 | 1.5168 | 64.1 |
| 16 | ∞ | 9.5 | | |
| 17 | −183.8 | 4.4 | 1.5891 | 61.2 |
| 18 | −22.6 | 0.2 | | |
| 19 | ∞ | 1.3 | 1.8467 | 23.8 |
| 20 | 18.1 | 7.5 | 1.5891 | 61.2 |
| 21 | −27.7 | 0.2 | | |
| 22 | 19.4 | 5 | 1.6968 | 55.5 |
| 23 | −141.9 | 15.9 | | |

[Conditional Expression Corresponding Value]

Conditional Expression (1) f1/f12 = 1.28
Conditional Expression (2) |f1/f2| = 0.39
Conditional Expression (3) f3/f = −0.35
Conditional Expression (4) f12/f = 0.45
Conditional Expression (5) vd3 = 61.2

Figure 22:
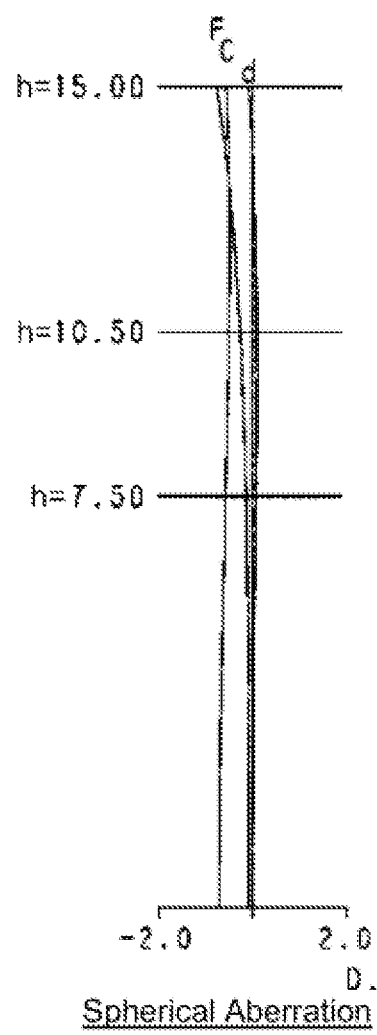
FIG. 22 shows graphs of spherical aberrations of the observation optical system (afocal system) according to the sixth example.
Figure 23:
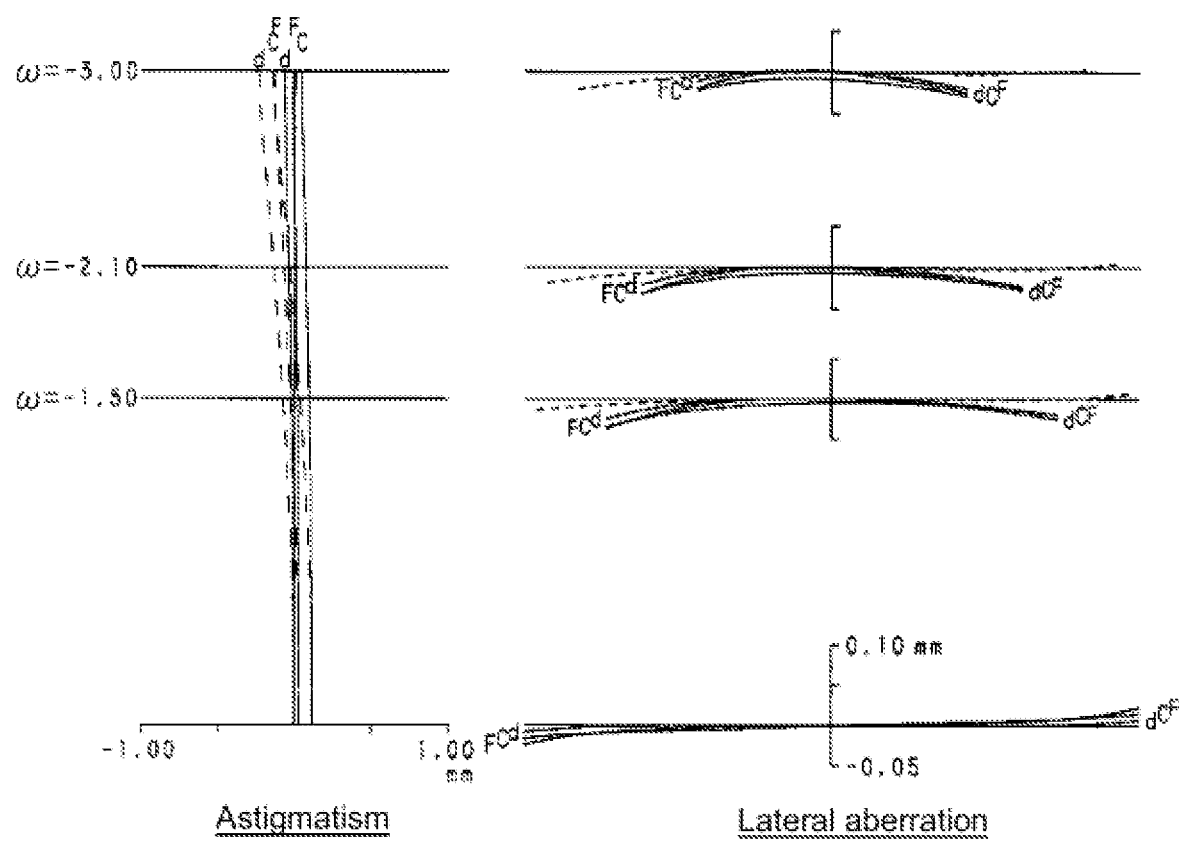
FIG. 23 shows graphs of various aberrations of the observation optical system in a state in which image blur is not corrected, according to the sixth ample.
Figure 24A:
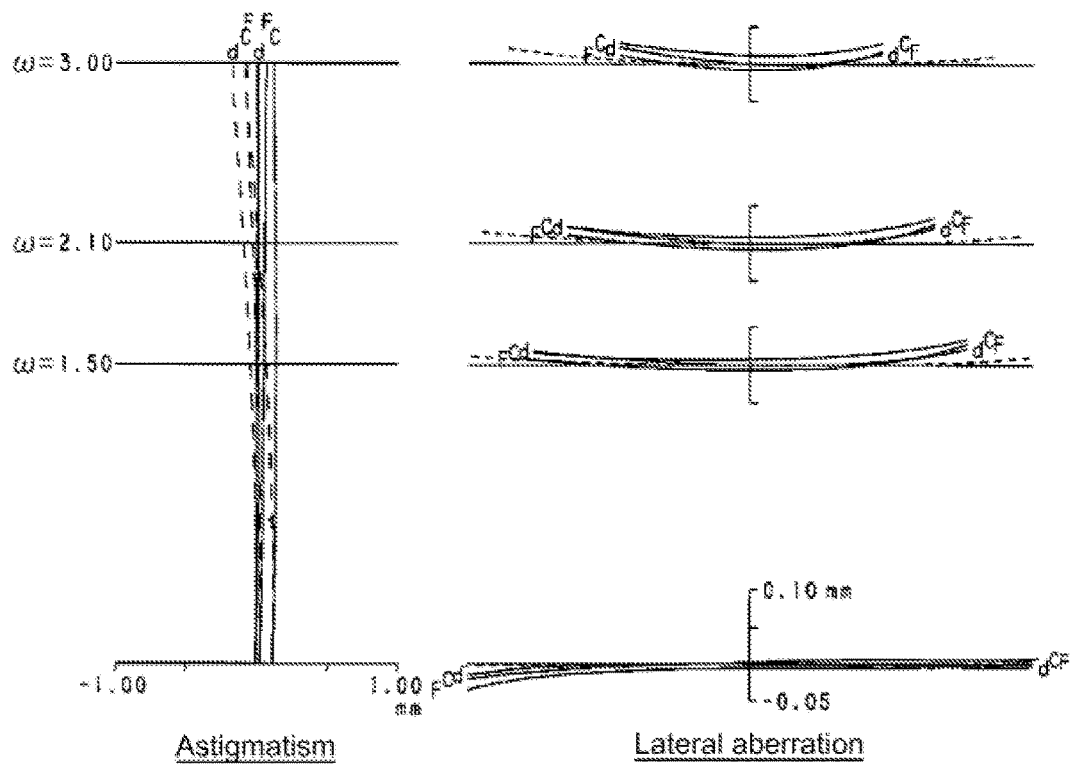
FIGS. 24A and 24B are graphs showing various aberrations of the observation optical system in a state in which image blur is corrected, according to the sixth example, where
Figure 24B:
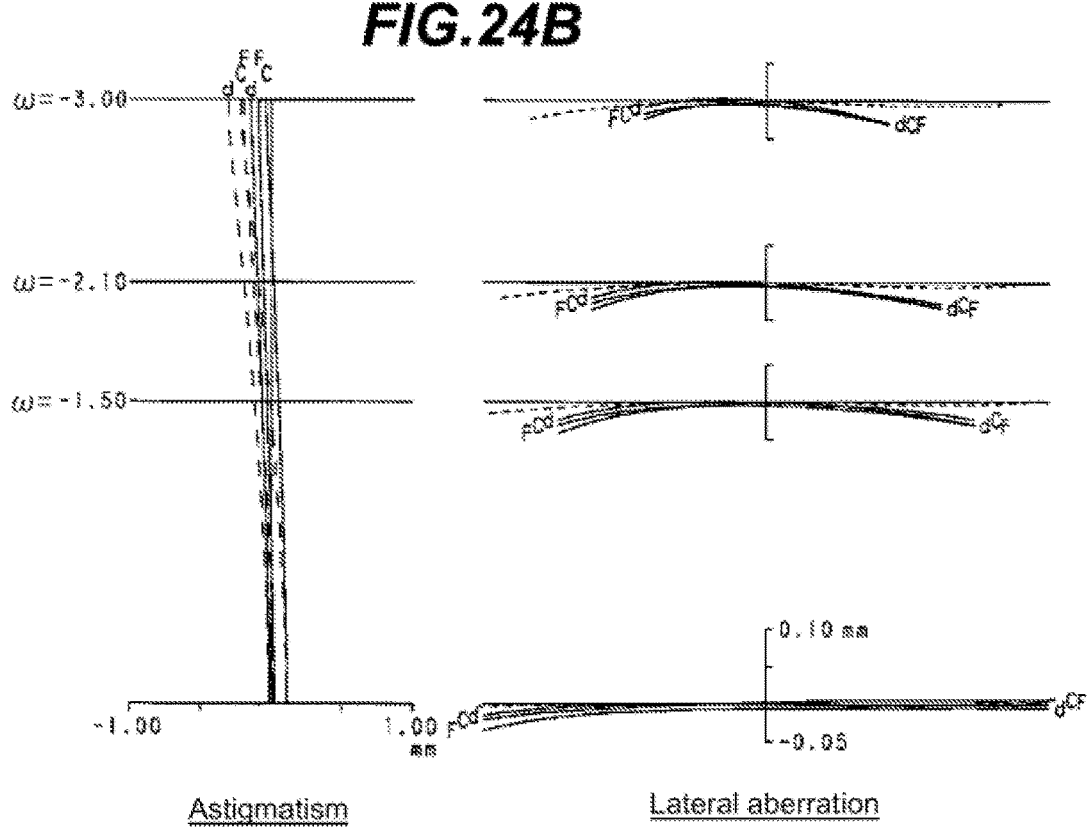

FIG. 22 show graphs of spherical aberrations of the observation optical system (afocal system) according to the sixth example. FIG. 23 shows graphs of various aberrations (graphs of astigmatism and graphs of lateral aberrations) of the observation optical system in a state in which image blur is not corrected, according to the sixth example FIGS. 24A and 24B show graphs of various aberrations of the observation optical system in a state in which image blur is corrected (the amount of shift of the third lens group G3=0.6 mm, the vibration proof correction angle 0.3°), according to the sixth example, where FIG. 24A shows various aberrations corresponding to positive angles of view, and FIG. 24B shows various aberrations corresponding to negative angles of view. In each of the graphs of aberrations, it is possible to ascertain that various aberrations are satisfactorily corrected in both the case in which image blur is not corrected and the curse in which image blur is corrected and the observation n optical system according to the sixth example has excellent image forming performance.

As described above, according to each of the examples, it is possible to realize the observation optical system LS that has a small configuration, is still capable of obtaining both a sufficient amount of correction of image blur for image shake or the like and an appropriate amount of movement of a focusing lens group, and is also capable of reducing eccentric aberrations generated in the correction of image blur.

Here each of the aforementioned examples illustrates a specific example of the present embodiment, and the present embodiment is not limited thereto.

EXPLANATION OF NUMERALS AND CHARACTERS

LS Observation optical system
OB Objective optical system
G1 First lens group
G2 Second lens group
G3 Third lens group
PR Erecting optical system
EP Eyepiece optical system

The invention claimed is:
1. An observation optical system comprising:
an objective optical system; and an eyepiece optical system for observing an image formed by the objective optical system, the objective optical system and the eyepiece optical system being aligned in order from an object,
wherein the objective optical system consists of, in order from the object, a first lens group that has positive refractive power, a second lens group that has positive or negative refractive power, and a third lens group that has negative refractive power,
focusing is performed by moving the second lens group along an optical axis,
the third lens group is configured to move in a direction that is perpendicular to the optical axis to correct image blur, and
the following conditional expression is satisfied:

$$0.70 \leq f1/f12 \leq 1.28$$

where f1 denotes a focal length of the first lens group, and
f12 denotes a combined focal length of the first lens group and the second lens group.

2. The observation optical system according to claim 1, comprising:
an erecting optical system disposed between the objective optical system and the eyepiece optical system and erecting the image formed by the objective optical system,
wherein the eyepiece optical system is used for observing the image erected by the erecting optical system.

3. The observation optical system according to claim 1, wherein the following conditional expressions are satisfied:

$$0.07 \leq |f1/f2| \leq 0.70$$

$$-0.50 \leq f3/f \leq -0.15$$

where
f denotes a focal length of the objective optical system,
f2 denotes a focal length of the second lens group, and
f3 denotes a focal length of the third lens group.

4. The observation optical system according to claim 1, wherein the following conditional expression is satisfied:

$$0.22 \leq f12/f \leq 0.62$$

where
f denotes a focal length of the objective optical system.

5. The observation optical system according to claim 1, wherein the third lens group consists of a single lens, and the following conditional expression is satisfied:

$$vd3 \geq 45$$

where
vd3 denotes an Abbe number with reference to a d-line of the single lens in the third lens group.

6. The observation optical system according to claim 1, wherein the third lens group consists of a cemented lens.

7. The observation optical system according to claim 1, wherein the second lens group has positive refractive power.

8. The observation optical system according to claim 1, wherein the second lens group has negative refractive power.

9. The observation optical system according to claim 1, wherein the second lens group consists of a single lens.

10. An observation optical system comprising:
an objective optical system; and an eyepiece optical system for observing an image formed by the objective optical system, the objective optical system and the eyepiece optical system being aligned in order from an object,
wherein the objective optical system consists of, in order from the object, a first lens group that has positive refractive power, a second lens group that has positive or negative refractive power, and a third lens group that has negative refractive power,
focusing is performed by moving the second lens group along an optical axis,
the third lens group is configured to move in a direction that is perpendicular to the optical axis to correct image blur, and
the following conditional expressions are satisfied:

$$0.70 \leq f1/f12 \leq 1.50$$

$$0.07 \leq |f1/f2| \leq 0.70$$

$$-0.50 \leq f3/f \leq -0.15$$

where f1 denotes a focal length of the first lens group,
f12 denotes a combined focal length of the first lens group and the second lens group,
f2 denotes a focal length of the second lens group,
f3 denotes a focal length of the third lens group, and
f denotes a focal length of the objective optical system.

11. The observation optical system according to claim 10, wherein the following conditional expression is satisfied:

$$0.22 \leq f12/f \leq 0.62.$$

12. The observation optical system according to claim 10, wherein the third lens group consists of a single lens, and the following conditional expression is satisfied:

$$vd3 \geq 45$$

where
vd3 denotes an Abbe number with reference to a d-line of the single lens in the third lens group.

13. The observation optical system according to claim 10, wherein the third lens group consists of a cemented lens.

14. The observation optical system according to claim 10, wherein the second lens group has positive refractive power.

15. The observation optical system according to claim 10, wherein the second lens group has negative refractive power.

16. The observation optical system according to claim 10, wherein the second lens group consists of a single lens.

17. An observation optical system comprising:
an objective optical system; and an eyepiece optical system for observing an image formed by the objective optical system, the objective optical system and the eyepiece optical system being aligned in order from an object,
wherein the objective optical system consists of, in order from the object, a first lens group that has positive refractive power, a second lens group that has negative refractive power, and a third lens group that has negative refractive power,
focusing is performed by moving the second lens group along an optical axis,
the third lens group is configured to move in a direction that is perpendicular to the optical axis to correct image blur, and
the following conditional expression is satisfied:

$$0.70 \leq f1/f12 \leq 1.50$$

where f1 denotes a focal length of the first lens group, and
f12 denotes a combined focal length of the first lens group and the second lens group.

18. The observation optical system according to claim 17, wherein the following conditional expression is satisfied:

$$0.22 \leq f12/f \leq 0.62$$

where
f denotes a focal length of the objective optical system.

19. The observation optical system according to claim 17, wherein the third lens group consists of a single lens, and the following conditional expression is satisfied:

$$vd3 \geq 45$$

where
vd3 denotes an Abbe number with reference to a d-line of the single lens in the third lens group.

20. The observation optical system according to claim 17, wherein the second lens group consists of a single lens.

* * * * *